(12) United States Patent
Liang et al.

(10) Patent No.: US 7,688,894 B2
(45) Date of Patent: *Mar. 30, 2010

(54) SCAN PATTERNS FOR INTERLACED VIDEO CONTENT

(75) Inventors: Jie Liang, Coquitlam (CA); Chih-Lung Lin, Redmond, WA (US); Sridhar Srinivasan, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1480 days.

This patent is subject to a terminal disclaimer.

(21) Appl. No.: 10/989,844

(22) Filed: Nov. 15, 2004

(65) Prior Publication Data

US 2005/0078754 A1   Apr. 14, 2005

Related U.S. Application Data

(63) Continuation-in-part of application No. 10/826,971, filed on Apr. 15, 2004.

(60) Provisional application No. 60/501,081, filed on Sep. 7, 2003.

(51) Int. Cl.
H04N 7/30 (2006.01)
H04N 7/50 (2006.01)

(52) U.S. Cl. .............. 375/240.18; 375/240.2; 375/240.24

(58) Field of Classification Search ............ 375/240.18, 375/240.2, 240.24; 382/248, 250
See application file for complete search history.

(56) References Cited

U.S. PATENT DOCUMENTS 4,698,672 A   10/1987   Chen
4,792,981 A   12/1988   Cahill et al.

(Continued)

FOREIGN PATENT DOCUMENTS

EP   0540350   5/1993

(Continued)

OTHER PUBLICATIONS

Gailly, "comp.compression Frequently Asked Questions (part 1/3)," 64 pp., document marked Sep. 5, 1999 [Downloaded from the World Wide Web on Sep. 5, 2007].

(Continued)

*Primary Examiner*—Mehrdad Dastouri
*Assistant Examiner*—David N Werner
(74) *Attorney, Agent, or Firm*—Klarquist Sparkman, LLP

(57) ABSTRACT

Tools and techniques for applying scan patterns during encoding and decoding of interlaced video are described. For example, a video decoder scans transform coefficients from a one-dimensional array to a two-dimensional block according to a scan pattern. The block is 4×4, and the scan pattern biases the vertical direction by starting with the DC coefficient and three AC coefficients of the lowest horizontal frequency. Or, the block is 8×4, and the scan pattern biases the vertical direction by starting with the DC coefficient and three AC coefficients of the lowest horizontal frequency. Or, the block is 4×8, and the scan pattern biases the horizontal direction for the lowest frequency AC coefficients in the horizontal and vertical directions but biases the vertical direction for at least some other AC coefficients. A corresponding video encoder applies the scan patterns to scan transform coefficients from two-dimensional blocks to one-dimensional arrays.

6 Claims, 15 Drawing Sheets

U.S. PATENT DOCUMENTS

| | | |
|---|---|---|
| 4,813,056 A | 3/1989 | Fedele |
| 4,901,075 A | 2/1990 | Vogel |
| 5,043,919 A | 8/1991 | Callaway et al. |
| 5,089,818 A | 2/1992 | Mahieux et al. |
| 5,107,345 A | 4/1992 | Lee |
| 5,128,758 A | 7/1992 | Azadegan |
| 5,146,324 A | 9/1992 | Miller et al. |
| 5,179,442 A | 1/1993 | Azadegan |
| 5,227,788 A | 7/1993 | Johnston |
| 5,227,878 A | 7/1993 | Puri et al. |
| 5,266,941 A | 11/1993 | Akeley et al. |
| 5,381,144 A | 1/1995 | Wilson et al. |
| 5,394,170 A | 2/1995 | Akeley et al. |
| 5,400,075 A | 3/1995 | Savatier |
| 5,457,495 A | 10/1995 | Hartung |
| 5,461,421 A | 10/1995 | Moon |
| 5,467,134 A | 11/1995 | Laney |
| 5,481,553 A | 1/1996 | Suzuki |
| 5,493,407 A | 2/1996 | Takahara |
| 5,504,591 A | 4/1996 | Dujari |
| 5,533,140 A | 7/1996 | Sirat et al. |
| 5,544,286 A | 8/1996 | Laney |
| 5,559,557 A | 9/1996 | Kato et al. |
| 5,579,430 A | 11/1996 | Grill et al. |
| 5,654,706 A | 8/1997 | Jeong et al. |
| 5,661,755 A | 8/1997 | Van de Kerkhof |
| 5,717,821 A | 2/1998 | Tsutsui |
| 5,748,245 A * | 5/1998 | Shimizu et al. ........ 375/240.03 |
| 5,748,789 A | 5/1998 | Lee et al. |
| 5,825,830 A | 10/1998 | Kopf |
| 5,828,426 A | 10/1998 | Yu |
| 5,835,144 A | 11/1998 | Matsumura |
| 5,883,633 A | 3/1999 | Gill et al. |
| 5,946,043 A | 8/1999 | Lee et al. |
| 5,974,184 A | 10/1999 | Eifrig et al. |
| 5,982,437 A | 11/1999 | Okazaki |
| 5,990,960 A | 11/1999 | Murakami |
| 5,995,670 A | 11/1999 | Zabinsky |
| 6,002,439 A | 12/1999 | Murakami |
| 6,049,630 A | 4/2000 | Wang et al. |
| 6,054,943 A | 4/2000 | Lawrence |
| 6,078,691 A | 6/2000 | Luttmer |
| 6,097,759 A | 8/2000 | Murakami |
| 6,100,825 A | 8/2000 | Sedluk |
| 6,111,914 A | 8/2000 | Bist |
| 6,148,109 A | 11/2000 | Boon |
| 6,154,572 A | 11/2000 | Chaddha |
| 6,205,256 B1 | 3/2001 | Chaddha |
| 6,215,910 B1 | 4/2001 | Chaddha |
| 6,223,162 B1 | 4/2001 | Chen |
| 6,226,407 B1 | 5/2001 | Zabih et al. |
| 6,233,017 B1 | 5/2001 | Chaddha |
| 6,253,165 B1 | 6/2001 | Malvar |
| 6,259,810 B1 | 7/2001 | Gill et al. |
| 6,272,175 B1 | 8/2001 | Sriram et al. |
| 6,292,588 B1 | 9/2001 | Shen |
| 6,300,888 B1 | 10/2001 | Chen |
| 6,304,928 B1 | 10/2001 | Mairs et al. |
| 6,337,881 B1 | 1/2002 | Chaddha |
| 6,341,165 B1 | 1/2002 | Gbur |
| 6,345,123 B1 | 2/2002 | Boon |
| 6,349,152 B1 | 2/2002 | Chaddha |
| 6,360,019 B1 | 3/2002 | Chaddha |
| 6,377,930 B1 | 4/2002 | Chen |
| 6,392,705 B1 | 5/2002 | Chaddha |
| 6,404,931 B1 | 6/2002 | Chen |
| 6,421,738 B1 | 7/2002 | Ratan et al. |
| 6,426,975 B1 | 7/2002 | Nishi et al. |
| 6,477,280 B1 | 11/2002 | Malvar |
| 6,493,385 B1 | 12/2002 | Sekiguchi et al. |
| 6,542,631 B1 | 4/2003 | Ishikawa |
| 6,556,625 B2 | 4/2003 | Haskell et al. |
| 6,573,915 B1 | 6/2003 | Sivan et al. |
| 6,646,578 B1 | 11/2003 | Au |
| 6,721,700 B1 | 4/2004 | Yin |
| 6,728,317 B1 | 4/2004 | Demos |
| 6,766,293 B1 | 7/2004 | Herre |
| 6,771,777 B1 | 8/2004 | Gbur |
| 6,795,584 B2 | 9/2004 | Karczewicz et al. |
| 7,162,094 B2 * | 1/2007 | Wang et al. ................. 382/236 |
| 7,555,044 B2 * | 6/2009 | Wang et al. ............ 375/240.18 |
| 2002/0012397 A1 | 1/2002 | De With et al. |
| 2003/0138150 A1 | 7/2003 | Srinivasan |
| 2003/0156648 A1 | 8/2003 | Holcomb et al. |
| 2004/0131119 A1 | 7/2004 | Wang et al. |
| 2004/0136457 A1 | 7/2004 | Funnell et al. |
| 2005/0015249 A1 | 1/2005 | Mehrotra et al. |
| 2005/0078754 A1 | 4/2005 | Liang et al. |

FOREIGN PATENT DOCUMENTS

| | | |
|---|---|---|
| EP | 0910927 | 1/1998 |
| EP | 0966793 | 9/1998 |
| EP | 0931386 | 1/1999 |
| JP | 5-292481 | 11/1993 |
| JP | 06-021830 | 1/1994 |
| JP | 7-274171 | 10/1995 |

OTHER PUBLICATIONS

Hui et al., "Matsushita Algorithm for Coding of Moving Picture Information," ISO/IEC-JTC1/SC29/WG11, MPEG91/217, 76 pp. (Nov. 1991).

Sullivan et al., "The H.264/AVC Advanced Video Coding Standard: Overview and Introduction to the Fidelity Range Extensions," 21 pp. (Aug. 2004).

Tu et al., "Context-Based Entropy Coding of Block Transform Coefficients for Image Compression," *IEEE Transactions on Image Processing*, vol. 11, No. 11, pp. 1271-1283 (Nov. 2002).

U.S. Appl. No. 60/341,674, filed Dec. 17, 2001, Lee et al.

U.S. Appl. No. 60/488,710, filed Jul. 18, 2003, Srinivasan et al.

Shamoon et al., "A Rapidly Adaptive Lossless Compression Algorithm for High Fidelity Audio Coding," *IEEE Data Compression Conf. 1994*, pp. 430-439 (Mar. 1994).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 2002) [Downloaded from the World Wide Web on Mar. 16, 2004].

Brandenburg, "ASPEC Coding," *AES 10th International Conference*, pp. 81-90 (Sep. 1991).

Cui et al., "A novel VLC based on second-run-level coding and dynamic truncation," *Proc. SPIE*, vol. 6077, pp. 607726-1 to 607726-9 (Jan. 2006).

De Agostino et al., "Parallel Algorithms for Optimal Compression using Dictionaries with the Prefix Property," in *Proc. Data Compression Conference, IEEE Computer Society Press*, pp. 52-62 (Mar. 1992).

Ishii et al., "Parallel Variable Length Decoding with Inverse Quantization for Software MPEG-2 Decoders," *IEEE Signal Processing Systems*, pp. 500-509 (Nov. 1997).

ISO/IEC, "ISO/IEC 11172-2, Information technology—Coding of moving pictures and associated audio for digital storage media at up to about 1.5 Mbit/s—Part 2: Video," 112 pp. (Aug. 1993).

ISO/IEC, "JTC1/SC29/WG11 N2202, Information Technology—Coding of Audio-Visual Objects: Visual, ISO/IEC 14496-2," 329 pp. (Mar. 1998).

ITU-T, "ITU-T Recommendation H.261, Video Codec for Audiovisual Services at p×64 kbits," 25 pp. (Mar. 1993).

ITU-T, "ITU-T Recommendation H.262, Information Technology—Generic Coding of Moving Pictures and Associated Audio Information: Video," 205 pp. (Jul. 1995).

ITU-T, "ITU-T Recommendation H.263, Video coding for low bit rate communication," 162 pp. (Feb. 1998).

ITU-T, "ITU-T Recommendation H.264," 283 pp. (May 2003).

Jeong et al., "Adaptive Huffman Coding of 2-D DCT Coefficients for Image Sequence Compression," *Signal Processing: Image Communication*, vol. 7, 11 pp. (Mar. 1995).

Wien et al., "16 Bit Adaptive Block Size Transforms," JVT-C107r1, 54 pp. (May 2002).

\* cited by examiner

Figure 1, prior art
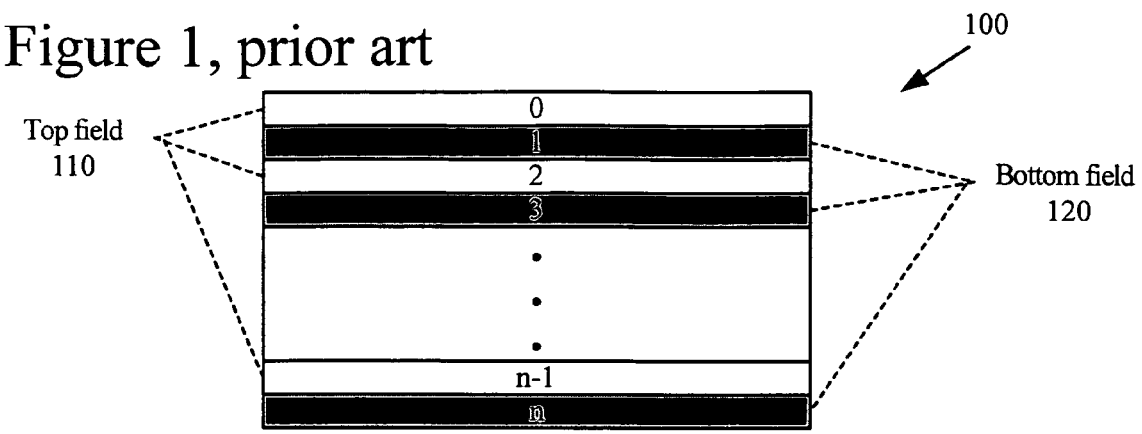
Figure 6, prior art
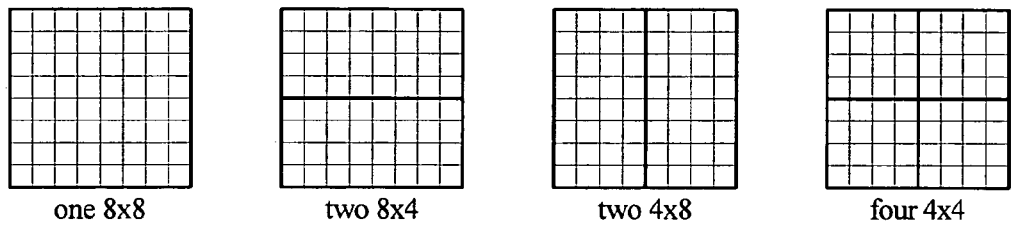

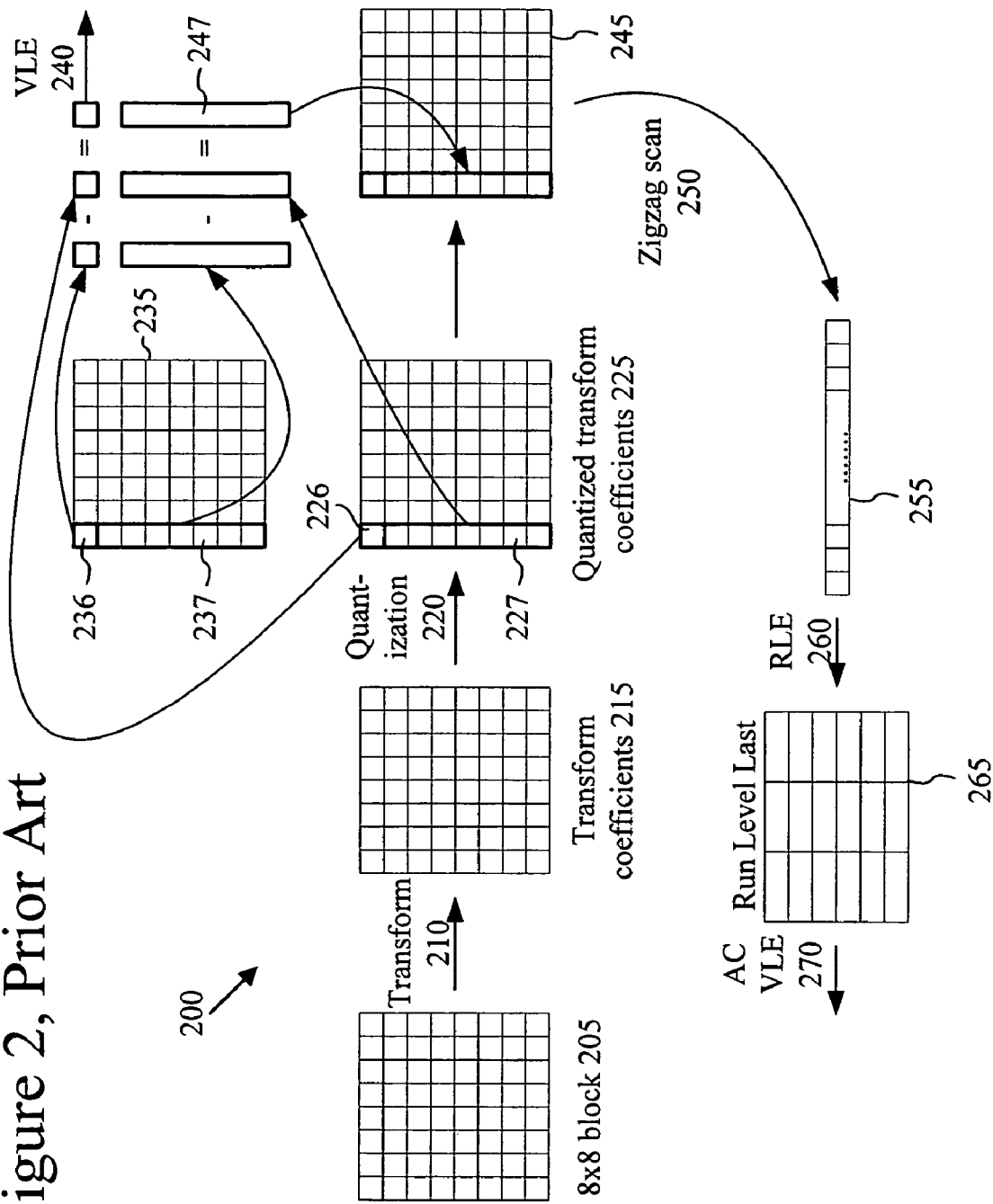
Figure 2, Prior Art

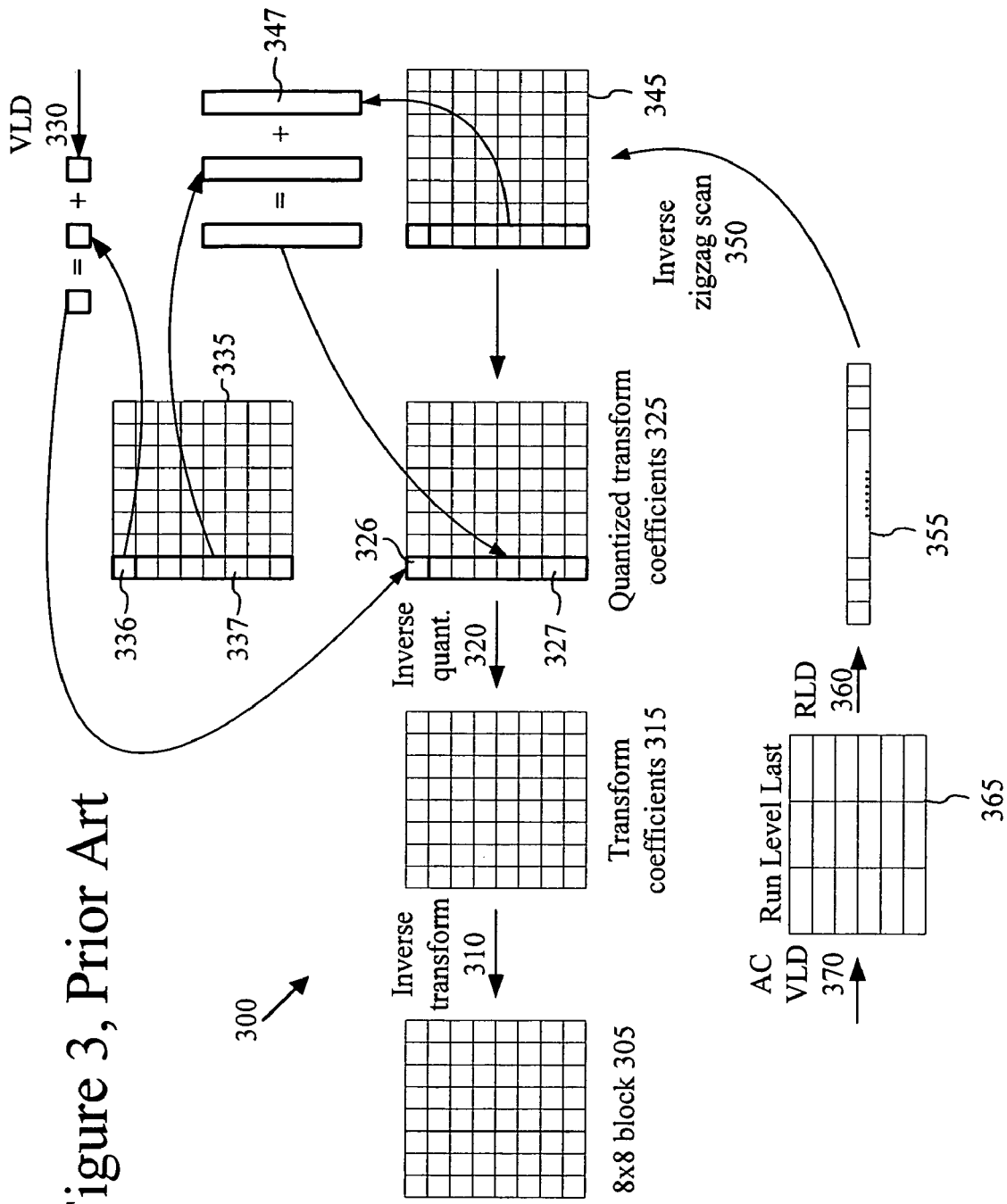
Figure 3, Prior Art

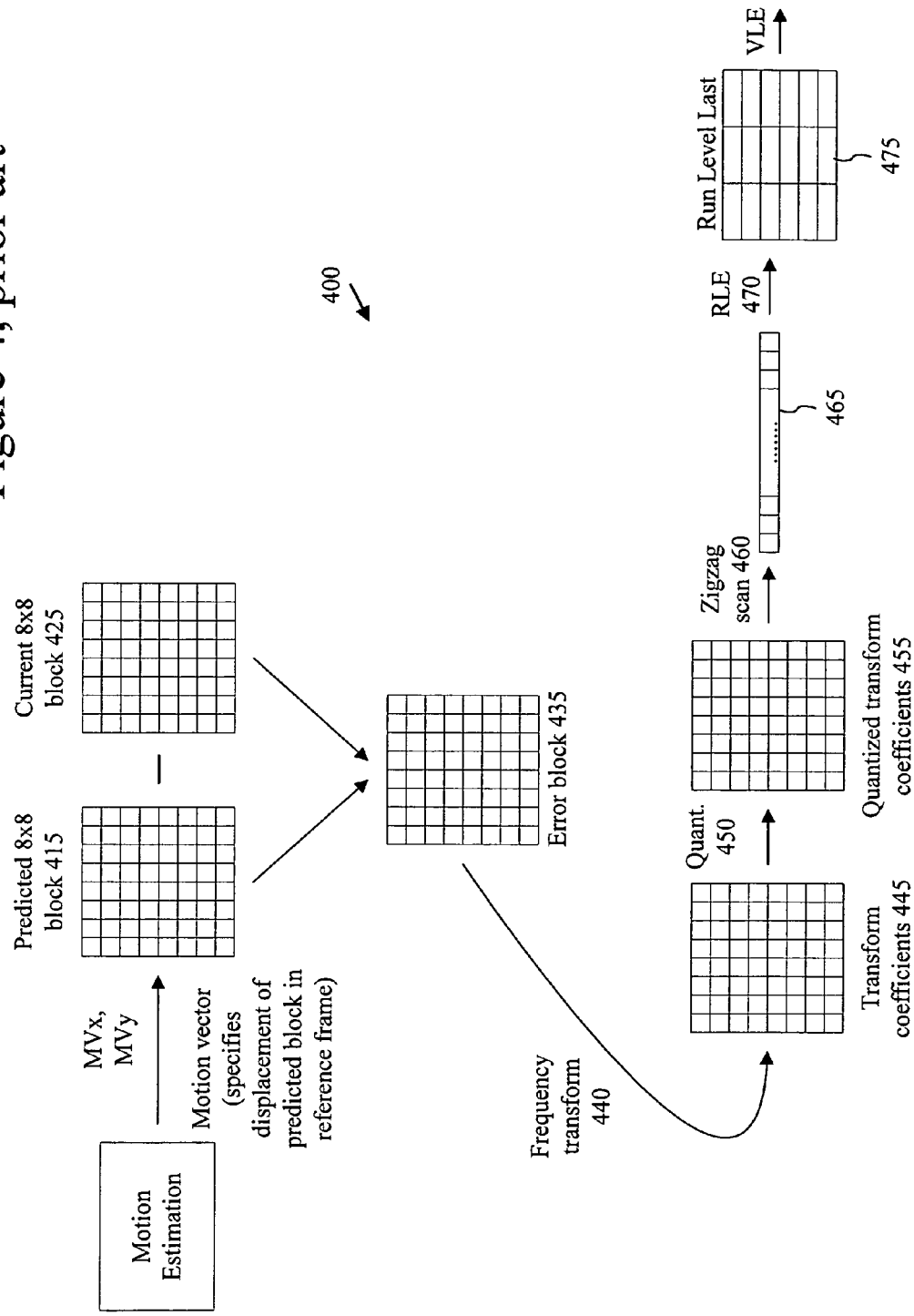
Figure 4, prior art

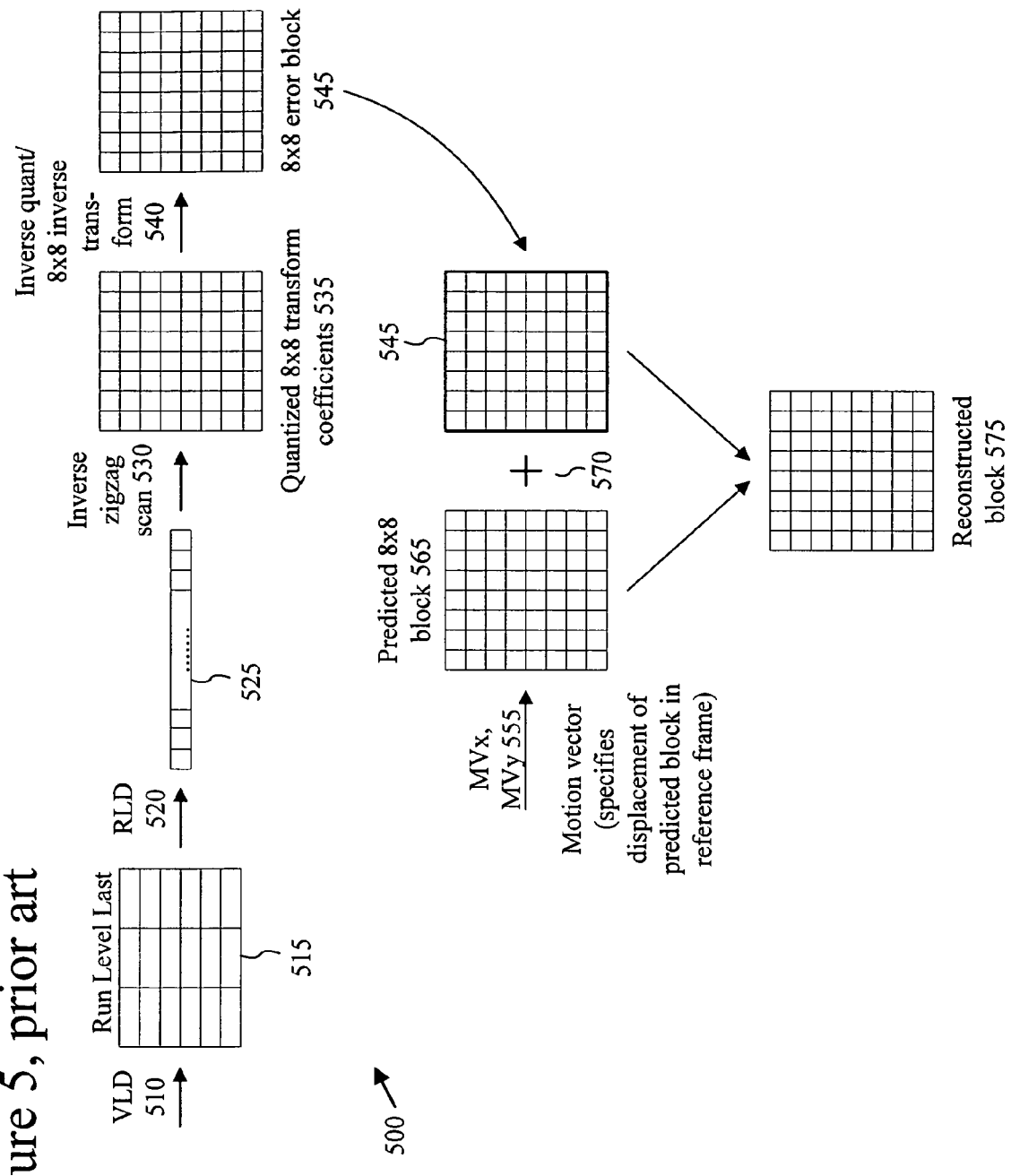
Figure 5, prior art

Figure 7A, prior art

| 0 | 2 | 3 | 9 | 10 | 21 | 22 | 36 |
|---|---|---|---|---|---|---|---|
| 1 | 4 | 8 | 11 | 20 | 23 | 35 | 37 |
| 5 | 7 | 12 | 19 | 24 | 34 | 38 | 49 |
| 6 | 13 | 18 | 25 | 33 | 39 | 48 | 50 |
| 14 | 16 | 26 | 32 | 40 | 47 | 51 | 58 |
| 15 | 27 | 31 | 41 | 46 | 52 | 57 | 59 |
| 17 | 29 | 42 | 44 | 53 | 55 | 60 | 62 |
| 28 | 30 | 43 | 45 | 54 | 56 | 61 | 63 |

Intra Normal Scan

Figure 7B, prior art

| 0 | 1 | 3 | 4 | 10 | 11 | 22 | 23 |
|---|---|---|---|---|---|---|---|
| 2 | 5 | 9 | 12 | 21 | 24 | 36 | 37 |
| 6 | 8 | 13 | 20 | 25 | 35 | 38 | 48 |
| 7 | 14 | 19 | 26 | 34 | 39 | 47 | 49 |
| 15 | 18 | 27 | 33 | 40 | 46 | 50 | 57 |
| 16 | 28 | 32 | 41 | 45 | 51 | 56 | 58 |
| 17 | 30 | 42 | 44 | 52 | 55 | 59 | 62 |
| 29 | 31 | 43 | 53 | 54 | 60 | 61 | 63 |

Intra Horizontal Scan

Figure 7C, prior art

| 0 | 3 | 8 | 9 | 20 | 21 | 34 | 35 |
|---|---|---|---|---|---|---|---|
| 1 | 7 | 10 | 19 | 22 | 33 | 36 | 49 |
| 2 | 11 | 18 | 23 | 32 | 37 | 48 | 50 |
| 4 | 12 | 17 | 24 | 31 | 38 | 47 | 51 |
| 5 | 16 | 25 | 30 | 39 | 46 | 52 | 57 |
| 6 | 15 | 29 | 40 | 45 | 53 | 56 | 58 |
| 13 | 26 | 28 | 41 | 44 | 55 | 59 | 62 |
| 14 | 27 | 42 | 43 | 54 | 60 | 61 | 63 |

Intra Vertical Scan

Figure 7D, prior art

| 0 | 2 | 3 | 9 | 10 | 23 | 24 | 38 |
|---|---|---|---|---|---|---|---|
| 1 | 4 | 8 | 11 | 22 | 25 | 37 | 39 |
| 5 | 7 | 12 | 21 | 26 | 36 | 40 | 51 |
| 6 | 13 | 20 | 27 | 35 | 41 | 50 | 52 |
| 14 | 19 | 28 | 34 | 42 | 49 | 53 | 60 |
| 15 | 18 | 33 | 43 | 48 | 54 | 59 | 61 |
| 16 | 29 | 32 | 44 | 47 | 55 | 58 | 62 |
| 17 | 30 | 31 | 45 | 46 | 56 | 57 | 63 |

Inter 8x8 Scan

Figure 7E, prior art

| 0 | 1 | 2 | 4 | 8 | 14 | 21 | 27 |
|---|---|---|---|---|---|---|---|
| 3 | 5 | 6 | 9 | 13 | 17 | 24 | 29 |
| 7 | 10 | 12 | 15 | 18 | 22 | 25 | 30 |
| 11 | 16 | 19 | 20 | 23 | 26 | 28 | 31 |

Inter 8x4 Scan

Figure 7F, prior art

| 0 | 2 | 7 | 19 |
|---|---|---|---|
| 1 | 4 | 9 | 22 |
| 3 | 6 | 12 | 24 |
| 5 | 10 | 15 | 26 |
| 8 | 14 | 18 | 28 |
| 11 | 17 | 23 | 29 |
| 13 | 20 | 25 | 30 |
| 16 | 21 | 27 | 31 |

Inter 4x8 Scan

Figure 7G, prior art

| 0 | 3 | 7 | 11 |
|---|---|---|---|
| 1 | 4 | 8 | 12 |
| 2 | 6 | 9 | 14 |
| 5 | 10 | 13 | 15 |

Inter 4x4 Scan

Figure 8, prior art

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

| 0 | 4 | 6 | 20 | 22 | 36 | 38 | 52 |
|---|---|---|---|---|---|---|---|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

H.262 alternate scan

Figure 10, prior art

| 1 | 2 | 3 | 4 | 11 | 12 | 13 | 14 |
|---|---|---|---|---|---|---|---|
| 5 | 6 | 9 | 10 | 18 | 17 | 16 | 15 |
| 7 | 8 | 20 | 19 | 27 | 28 | 29 | 30 |
| 21 | 22 | 25 | 26 | 31 | 32 | 33 | 34 |
| 23 | 24 | 35 | 36 | 43 | 44 | 45 | 46 |
| 37 | 38 | 41 | 42 | 47 | 48 | 49 | 50 |
| 39 | 40 | 51 | 52 | 57 | 58 | 59 | 60 |
| 53 | 54 | 55 | 56 | 61 | 62 | 63 | 64 |

H.263 alternate horizontal scan

Figure 11A, prior art

| 0 | 1 | 5 | 6 |
|---|---|---|---|
| 2 | 4 | 7 | 12 |
| 3 | 8 | 11 | 13 |
| 9 | 10 | 14 | 15 |

JVT-D157 4x4 zigzag scan

Figure 11B, prior art

| 0 | 2 | 3 | 9 |
|---|---|---|---|
| 1 | 4 | 8 | 10 |
| 5 | 7 | 11 | 17 |
| 6 | 12 | 16 | 18 |
| 13 | 15 | 19 | 25 |
| 14 | 20 | 24 | 26 |
| 21 | 23 | 27 | 30 |
| 22 | 28 | 29 | 31 |

JVT-D157 4x8 zigzag scan

Figure 11C, prior art

| 0 | 1 | 5 | 6 | 13 | 14 | 21 | 22 |
|---|---|---|---|---|---|---|---|
| 2 | 4 | 7 | 12 | 15 | 20 | 23 | 28 |
| 3 | 8 | 11 | 16 | 19 | 24 | 27 | 29 |
| 9 | 10 | 17 | 18 | 25 | 26 | 30 | 31 |

JVT-D157 8x4 zigzag scan

Figure 11D, prior art

| 0 | 2 | 8 | 12 |
|---|---|---|---|
| 1 | 5 | 9 | 13 |
| 3 | 6 | 10 | 14 |
| 4 | 7 | 11 | 15 |

JVT-D157 4x4 field scan

Figure 11E, prior art

| 0 | 4 | 12 | 20 |
|---|---|---|---|
| 1 | 5 | 13 | 21 |
| 2 | 6 | 14 | 22 |
| 3 | 11 | 19 | 27 |
| 7 | 15 | 23 | 28 |
| 8 | 16 | 24 | 29 |
| 9 | 17 | 25 | 30 |
| 10 | 18 | 26 | 31 |

JVT-D157 4x8 field scan

Figure 11F, prior art

| 0 | 2 | 6 | 10 | 14 | 18 | 22 | 26 |
|---|---|---|---|---|---|---|---|
| 1 | 5 | 9 | 13 | 17 | 21 | 25 | 29 |
| 3 | 7 | 11 | 15 | 19 | 23 | 27 | 30 |
| 4 | 8 | 12 | 16 | 20 | 24 | 28 | 31 |

JVT-D157 8x4 field scan

Figure 11G, prior art

| 0  | 3  | 8  | 15 | 22 | 30 | 38 | 52 |
|----|----|----|----|----|----|----|----|
| 1  | 4  | 14 | 21 | 29 | 37 | 45 | 53 |
| 2  | 7  | 16 | 23 | 31 | 39 | 46 | 58 |
| 5  | 9  | 20 | 28 | 36 | 44 | 51 | 59 |
| 6  | 13 | 24 | 32 | 40 | 47 | 54 | 60 |
| 10 | 17 | 25 | 33 | 41 | 48 | 55 | 61 |
| 11 | 18 | 26 | 34 | 42 | 49 | 56 | 62 |
| 12 | 19 | 27 | 35 | 43 | 50 | 57 | 63 |

JVT-D157 8x8 field scan

Software 1280 implementing video encoder and/
or decoder with improved scan pattern(s)

Figure 15A
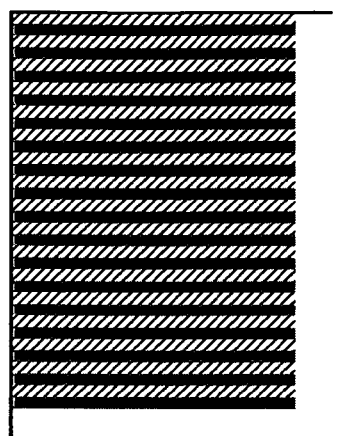
Figure 15B
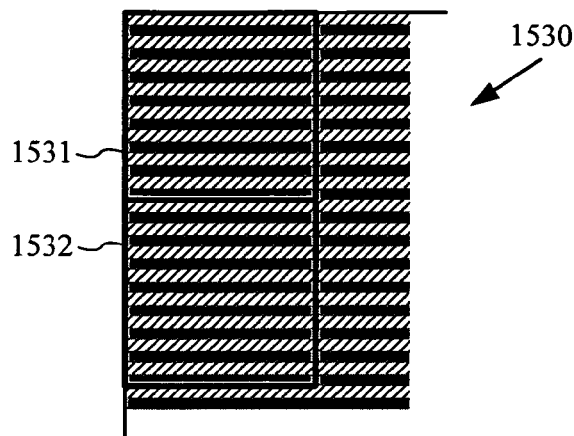
Figure 15C
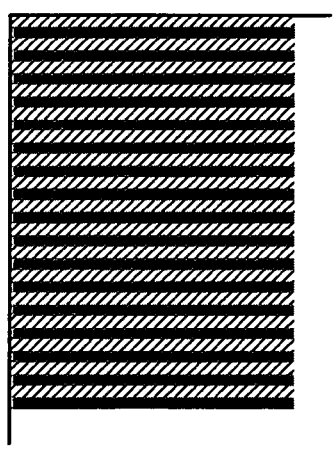
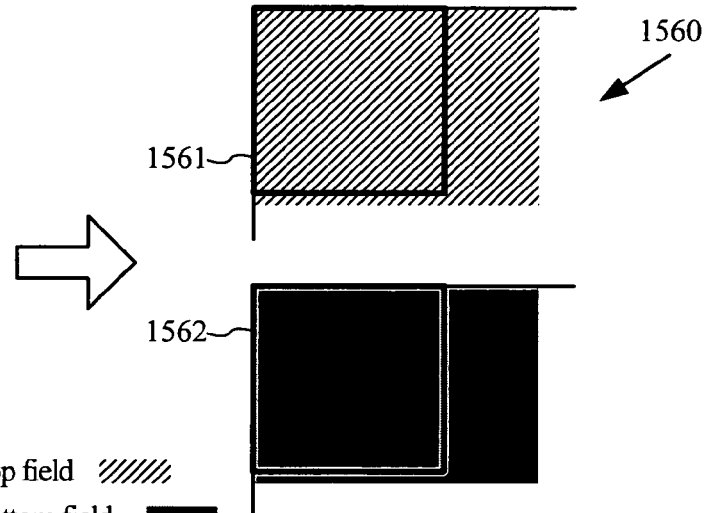

Figure 18A

| 0 | 2 | 4 | 7 | 10 | 14 | 21 | 27 |
|---|---|---|---|----|----|----|----|
| 1 | 5 | 6 | 11 | 13 | 17 | 24 | 29 |
| 3 | 9 | 12 | 15 | 18 | 22 | 25 | 30 |
| 8 | 16 | 19 | 20 | 23 | 26 | 28 | 31 |

Progressive Mode Inter 8x4
Scan for Advanced Profile

Figure 18B

| 0 | 1 | 3 | 13 |
|---|---|---|----|
| 2 | 4 | 8 | 17 |
| 5 | 6 | 11 | 24 |
| 7 | 10 | 15 | 26 |
| 9 | 14 | 20 | 28 |
| 12 | 19 | 23 | 29 |
| 16 | 21 | 25 | 30 |
| 18 | 22 | 27 | 31 |

Progressive Mode Inter 4x8
Scan for Advanced Profile

Figure 20B

| 0 | 4 | 6 | 10 | 13 | 17 | 21 | 27 |
|---|---|---|----|----|----|----|----|
| 1 | 5 | 9 | 14 | 16 | 18 | 24 | 29 |
| 2 | 7 | 11 | 15 | 19 | 22 | 25 | 30 |
| 3 | 8 | 12 | 20 | 23 | 26 | 28 | 31 |

Interlace Mode Inter 8x4
Scan for Advanced Profile

Figure 20A

| 0 | 2 | 6 | 13 | 17 | 29 | 33 | 38 |
|---|---|---|----|----|----|----|----|
| 1 | 5 | 12 | 16 | 28 | 32 | 37 | 39 |
| 3 | 11 | 15 | 27 | 31 | 36 | 40 | 51 |
| 4 | 14 | 22 | 30 | 35 | 41 | 50 | 52 |
| 7 | 18 | 23 | 34 | 42 | 49 | 53 | 60 |
| 8 | 19 | 24 | 43 | 48 | 54 | 59 | 61 |
| 9 | 20 | 25 | 44 | 47 | 55 | 58 | 62 |
| 10 | 21 | 26 | 45 | 46 | 56 | 57 | 63 |

Interlace Mode Inter 8x8 Scan for
Advanced Profile (Also used for Intra Mode
8x8 scan for Interlace I-, P-, and B-frames)

Figure 20C

| 0 | 1 | 2 | 9 |
|---|---|---|---|
| 3 | 5 | 8 | 22 |
| 4 | 7 | 15 | 24 |
| 6 | 14 | 17 | 26 |
| 10 | 16 | 19 | 28 |
| 11 | 18 | 23 | 29 |
| 12 | 20 | 25 | 30 |
| 13 | 21 | 27 | 31 |

Interlace Mode Inter 4x8
Scan for Advanced Profile

Figure 20D

| 0 | 4 | 7 | 11 |
|---|---|---|----|
| 1 | 5 | 9 | 13 |
| 2 | 6 | 10 | 14 |
| 3 | 8 | 12 | 15 |

Interlace Mode Inter 4x4
Scan for Advanced Profile

SCAN PATTERNS FOR INTERLACED VIDEO CONTENT

CROSS REFERENCE TO RELATED APPLICATIONS

This application is a continuation-in-part of U.S. patent application Ser. No. 10/826,971, filed Apr. 15, 2004, which claims the benefit of U.S. Provisional Patent Application Ser. No. 60/501,081, filed Sep. 7, 2003, the disclosures of which are incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

Tools and techniques for applying scan patterns during encoding and decoding of interlaced video are described. For example, a video decoder applies a scan pattern adapted for interlaced video to transform coefficients in inter-coded blocks.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. Intra-picture compression techniques compress individual pictures (typically called I-pictures or key pictures), and inter-picture compression techniques compress pictures (typically called predicted pictures, P-pictures, or B-pictures) with reference to a preceding and/or following picture (typically called a reference or anchor picture) or pictures (for B-pictures).

I. Interlaced Video and Progressive Video

A video frame contains lines of spatial information of a video signal. For progressive video, these lines contain samples starting from one time instant and continuing in raster scan fashion (left to right, top to bottom) through successive, non-alternating lines to the bottom of the frame.

The primary aspect of interlaced video is that the raster scan of an entire video frame is performed in two passes by scanning alternate lines in each pass. For example, the first scan is made up of the even lines of the frame and the second scan is made up of the odd lines of the scan. This results in each frame containing two fields representing two different time epochs. FIG. 1 shows an interlaced video frame (100) that includes top field (110) and bottom field (120). In the frame (100), the even-numbered lines (top field) are scanned starting at one time (e.g., time t), and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure for coding, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

II. Windows Media Video, Versions 8 and 9

Microsoft Corporation's Windows Media Video, Versions 8 ["WMV8"] and 9 ["WMV9"] each include a video encoder and a video decoder. The encoders use intra-frame and inter-frame compression, and the decoders use intra-frame and inter-frame decompression.

A. Intra-frame Compression and Decompression

FIG. 2 illustrates block-based intra compression in the encoder, which reduces bit rate by removing spatial redundancy in a picture. In particular, FIG. 2 illustrates compression of an 8×8 block (205) of samples of an intra frame by the encoder. The encoder splits the frame into 8×8 blocks of samples and applies an 8×8 frequency transform (210) (such as a discrete cosine transform ["DCT"]) to individual blocks such as the block (205). The encoder quantizes (220) the transform coefficients (215), resulting in an 8×8 block of quantized transform coefficients (225).

Further encoding varies depending on whether a coefficient is a DC coefficient (the top left coefficient), an AC coefficient in the top row or left column, or another AC coefficient. The encoder typically encodes the DC coefficient (226) as a differential from the DC coefficient (236) of a neighboring 8×8 block, which is a previously encoded and decoded/reconstructed top or left neighbor block. The encoder entropy encodes (240) the differential.

The entropy encoder can encode the left column or top row of AC coefficients as differentials from AC coefficients a corresponding left column or top row of a neighboring 8×8 block. FIG. 2 shows the left column (227) of AC coefficients encoded as differentials (247) from the left column (237) of the neighboring (actually situated to the left) block (235).

The encoder scans (250) the 8×8 block (245) of predicted, quantized AC coefficients into a one-dimensional array (255). For the scanning, the encoder uses a scan pattern that depends on the DC/AC prediction direction, as described below. The encoder then entropy encodes the scanned coefficients using a variation of run/level coding (260). The encoder selects variable length codes ["VLCs"] from run/level/last tables (265) and outputs the VLCs.

FIG. 3 shows an example of corresponding decoding (300) for an intra-coded block by the decoder. In particular, FIG. 3 illustrates decompression of an 8×8 block of samples of an intra frame by the decoder to produce a reconstructed version (305) of the original 8×8 block (205).

The decoder receives and decodes (370) VLCs with run/level/last tables (365). The decoder run/level decodes (360) AC coefficients and puts the results into a one-dimensional array (355), from which the AC coefficients are inverse scanned (350) into a two-dimensional block (345). (The scan patterns are described below.)

The AC coefficients of the left column or top row of the block (345) may be differentials, in which case the decoder combines them with corresponding AC coefficients from a neighboring 8×8 block. In FIG. 3, the left column (347) of AC coefficients are differentials, and they are combined with AC coefficients of the left column (337) of a neighboring (actually situated to the left) block (335) to produce a left column (327) of AC coefficients in a block (325) of quantized transform coefficients.

To decode the DC coefficient (326), the decoder decodes (340) a DC differential. The decoder combines the DC differential with a DC coefficient (336) of a neighboring 8×8 block to produce the DC coefficient (326) of the block (325) of quantized transform coefficients.

The decoder inverse quantizes (320) the quantized transform coefficients of the block (325), resulting in a block (315) of transform coefficients. The decoder applies an inverse frequency transform (310) to the block (315) of transform coefficients, producing the reconstructed version (305) of the original 8×8 block (205).

B. Inter-frame Compression and Decompression

FIG. 4 illustrates block-based inter compression in an encoder, and FIG. 5 illustrates corresponding decompression in a decoder. Inter-frame compression techniques often use motion estimation and motion compensation, which reduces bit rate by removing temporal redundancy in a video sequence. Residual information after motion compensation is further compressed by removing spatial redundancy in it.

For example, for motion estimation an encoder divides a current predicted frame into 8×8 or 16×16 pixel units. For a unit of the current frame, a similar unit in a reference frame is found for use as a predictor. A motion vector indicates the location of the predictor in the reference frame. The encoder computes the sample-by-sample difference between the current unit and the predictor to determine a residual (also called error signal). If the current unit size is 16×16, the residual is divided into four 8×8 blocks. To each 8×8 residual, the encoder applies a reversible frequency transform operation, which generates a set of frequency domain (i.e., spectral) coefficients. The resulting blocks of transform coefficients are quantized and entropy encoded. If the predicted frame is used as a reference for subsequent motion compensation, the encoder reconstructs the predicted frame. When reconstructing residuals, the encoder reconstructs transform coefficients (e.g., DCT coefficients) that were quantized and performs an inverse frequency transform such as an inverse DCT ["IDCT"]. The encoder performs motion compensation to compute the predictors, and combines the predictors with the residuals. During decoding, a decoder typically entropy decodes information and performs analogous operations to reconstruct residuals, perform motion compensation, and combine the predictors with the residuals.

When processing 8×8 blocks of motion compensation prediction residuals, the WMV8 encoder/decoder may switch between different sizes of DCT/IDCT. In particular, the WMV8 encoder/decoder may use of one of an 8×8 DCT/IDCT, two 4×8 DCT/IDCTs, or two 8×4 DCT/IDCTs for an 8×8 prediction residual block. The WMV9 encoder/decoder may also use four 4×4 block size transforms for an 8×8 prediction residual block, but uses a transform other than DCT. FIG. 6 illustrates different transform block sizes for an 8×8 prediction residual block. Variable-size transform blocks allows the encoder to choose the block partition that leads to the lowest bit rate representation for a block.

In particular, FIG. 4 shows transform coding and compression of an 8×8 prediction error block (410) using two 8×4 DCTs (440). A video encoder computes (408) an error block (410) as the difference between a predicted block (402) and a current 8×8 block (404). The video encoder applies either an 8×8 DCT (not shown), two 8×4 DCTs (440), or two 4×8 DCTs (not shown) to the error block (410). For the 8×4 DCT (440), the error block (410) becomes two 8×4 blocks of DCT coefficients (442, 444), one for the top half of the error block (410) and one for the bottom half. The encoder quantizes (446) the data, which typically results in many of the coefficients being remapped to zero. The encoder scans (450) the blocks of quantized coefficients (447, 448) into one-dimensional arrays (452, 454) with 32 elements each, such that coefficients are generally ordered from lowest frequency to highest frequency in each array. In the scanning, the encoder uses a scan pattern for the 8×4 DCT, as described below. (For other size transforms, the encoder uses different scan patterns, as described below.) The encoder entropy codes the data in the one-dimensional arrays (452, 454) using a combination of run length coding (480) and variable length encoding (490) with one or more run/level/last tables (485).

FIG. 5 shows decompression and inverse transform coding of an 8×8 prediction error block (510) using two 8×4 IDCTs (540). The decoder may also perform inverse transform coding using a 4×8 IDCT or 8×8 IDCT (not shown). The decoder entropy decodes data into one-dimensional arrays (552, 554) of quantized coefficients using a combination of variable length decoding (590) and run length decoding (580) with one or more run/level/last tables (585). The decoder scans (550) the data into blocks of quantized DCT coefficients (547, 548) using the scan pattern for the 8×4 DCT. (The decoder uses other scan patterns for an 8×8 or 4×8 DCT.) The decoder inverse quantizes (546) the data and applies (540) an 8×4 IDCT to the coefficients, resulting in an 8×4 block (512) for the top half of the error block (510) and an 8×4 block (514) for the bottom half of the error block (510). The decoder combines the error block (510) with a predicted block (502) (from motion compensation) to form a reconstructed 8×8 block (504).

C. Scan Patterns in WMV8 and WMV9

During encoding, it is common for most of the transform coefficients of a transform block to have a value of zero after quantization. A good scan pattern gives higher priority to coefficients that are more likely to have non-zero values. In other words, such coefficients are scanned earlier in the scan pattern. In this way, the non-zero coefficients are more likely to be bunched together, followed by one or more long groups of zero value coefficients. In particular, this leads to more efficient run/level/last coding, but other forms of entropy coding also benefit from the reordering.

A WMV8 encoder and decoder use different scan patterns for different size transform blocks. FIGS. 7A through 7F show scan patterns for different block sizes and intra or inter compression types according to WMV8. In general, the same scan patterns are used for progressive frames and interlaced frames.

FIGS. 7A through 7C show scan patterns for intra-coded blocks of I-pictures. In general, one of the three scan arrays is used for a given intra-coded block depending on the AC prediction status for the block. If AC prediction is from the top, the horizontal scan pattern shown in FIG. 7B is used. If AC prediction is from the left, the vertical scan pattern shown in FIG. 7C is used. And if no AC prediction is used, the normal scan pattern shown in FIG. 7A is used.

FIGS. 7D through 7F show scan patterns for blocks of P-pictures. FIG. 7D shows a scan pattern for an intra-coded block or 8×8 inter-coded block in a P-picture. FIGS. 7E and 7F show scan patterns for inter-coded 8×4 and 4×8 blocks, respectively, in a P-picture.

A WMV9 encoder and decoder also use the scan patterns shown in FIGS. 7A through 7F. FIG. 7G shows a scan pattern for 4×4 inter-coded block size, which is another block size option according to WMV9. Again, the same scan patterns are used for progressive frames and interlaced frames (with the exception of scanning chrominance transform coefficients, which are in 4×8 blocks due to the chrominance sampling pattern in WMV9).

While the scan patterns in WMV8 and WMV9 help overall performance in many scenarios, there are opportunities for improvement. In particular, the 8×4 and 4×8 inter scan patterns are not particularly well suited for many common configurations of non-zero transform coefficients for progressive video in 8×4 and 4×8 inter-coded blocks. As a result, the scan patterns often provide sub-optimal re-ordering of transform coefficients for progressive video in 8×4 and 4×8 inter-coded blocks, which hurts the efficiency of subsequent entropy coding. Since the scan pattern affects block-level operations, and since each video picture can include hundreds or thousands of blocks, even a small change in efficiency can dramatically affect overall compression results.

Similarly, the scan patterns are not particularly well suited for common configurations of non-zero transform coefficients in inter-coded blocks of interlaced video. Again, this hurts the efficiency of subsequent entropy coding and can dramatically affect overall compression results.

III. Video Codec Standards

Various standards specify aspects of video decoders as well as formats for compressed video information. These standards include H.261, MPEG-1, H.262 (also called MPEG-2), H.263, and MPEG-4. Directly or by implication, these standards may specify certain encoder details, but other encoder details are not specified. Different standards incorporate different techniques, but each standard typically specifies one or more scan patterns for transform coefficients as briefly discussed below. For additional detail, see the respective standards.

A. Scan Patterns in the H.261 and MPEG Standard

The H.261 standard describes a transmission order for transform coefficients in an 8×8 block (compressed using intra-compression or motion compensation). The transform coefficients are run/level coded in the transmission order shown in FIG. 8. The transmission order proceeds from the low frequency coefficient at the upper left of the block in a neutral, zigzag pattern down to the highest frequency coefficient at the bottom right of the block.

The scan pattern described in the MPEG standard is basically the same as the scan pattern shown in FIG. 8. AC coefficients of intra-coded blocks are processed according to the scan pattern. The DC coefficient and AC coefficients of inter-coded blocks are processed according to the scan pattern.

The scan pattern shown in FIG. 8 is neutral in that neither rows nor columns are favored over the other in the ordering. The effectiveness of the scan pattern is limited in that it does not work for block sizes other than 8×8 and is not well suited for interlaced video.

B. Scan Patterns in the H.262 Standard

The H.262 standard describes two different 8×8 scan patterns. The syntax element "alternate_scan" (signaled at picture layer in the bitstream) indicates which of the two scan patterns to use for a picture.

The first H.262 scan pattern is the scan pattern described in the MPEG-1 standard, which is a neutral, zigzag scan pattern. FIG. 9 shows the other H.262 scan pattern. The scan pattern shown in FIG. 9 is biased in the vertical direction in that columns are favored over rows in the ordering. For example, columns are scanned earlier in the order such that the first column finishes before the first row, the second column finishes before the second row, etc. The scan patterns still do not work for block sizes other than 8×8, however. Moreover, the use of an additional bit per picture just for this purpose adds to bit rate and encoder/decoder complexity.

C. Scan Patterns in the H.263 and MPEG-4 Standards

The H.263 standard describes three different 8×8 scan patterns. The type of prediction used for DC and AC coefficients for a block indicates which scan pattern to use. If no AC prediction is used for an intra-coded block, and for all non-intra-coded blocks, the neutral, zigzag scan pattern shown in FIG. 8 is chosen. If the vertically adjacent block is used to predict the DC coefficient and top row of AC coefficient of the current intra-coded block, the scanning pattern shown in FIG. 10 (H.263 alternate horizontal scan) is chosen to scan the stronger, horizontal frequencies prior to the vertical ones. On the other hand, if the horizontally adjacent block is used to predict the DC coefficient and left column of AC coefficient of the current intra-coded block, a scanning pattern like the one shown in FIG. 9 is chosen to scan the stronger, vertical frequencies prior to the horizontal ones. (The H.263 alternate vertical scan has the same pattern as the alternate scan in H.262, with the numbers are increased by 1 throughout.)

Similarly, the MPEG-4 standard describes a neutral scan pattern, an alternate horizontal scan pattern, and an alternate vertical scan pattern, where the scan pattern used depends on whether or not the block is intra-coded and the prediction direction.

As with various previous standards, the H.263 and MPEG-4 scan patterns do not work for block sizes other than 8×8.

D. Scan Patterns in the Drafts of the H.264 Standard

Draft JVT-D157 of the H.264 standard describes two sets of four scan patterns—a first set of four neutral, zigzag scan patterns and a second set of four field scan patterns. By default, the 4×4 scan pattern shown in FIG. 11A is used for 4×4 partitions of blocks. The 4×4 scan pattern is a neutral, zigzag pattern that biases neither the horizontal nor vertical direction.

If adaptive block size transforms are used, however, additional scan patterns are used for different block sizes. With adaptive block size transforms, transform block sizes of 4×8, 8×4, and 8×8 (in addition to 4×4) are available for luminance motion compensation residual information. Draft JVT-D157 describes decoding of either progressive frames or interlaced frames, which may be mixed together in the same video sequence. For blocks encoded/decoded in frame mode (e.g., for progressive frames), the zigzag scan patterns shown in FIGS. 8 and 11A through 11C are used for the respective block sizes. For blocks encoded/decoded in field mode (e.g., for interlaced fields), the field scan patterns shown in FIGS. 11D through 11G are used for the respective block sizes.

While the scan patterns in JVT-D157 provide good performance in many scenarios, there are opportunities for improvement. In particular, the 8×4 and 4×8 zigzag scan patterns are not particularly well suited for many common configurations of non-zero transform coefficients for progressive video in 8×4 and 4×8 inter-coded blocks, which hurts the efficiency of subsequent entropy coding. Moreover, the 8×8, 8×4, and 4×4 field scan patterns, while somewhat vertically biased, are not biased aggressively enough in the vertical direction to be effective for inter-coded blocks of interlaced video fields. The 4×8 field scan pattern is vertically biased, but fails to account for common configurations of non-zero transform coefficients in 4×8 inter-coded blocks of interlaced video fields. Each of these things hurts the efficiency of subsequent entropy coding and adversely affects overall compression results.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to scan patterns adapted for interlaced video. These scan patterns improve the efficiency of entropy coding and thus have a positive impact on overall compression results. The described techniques and tools include, but are not limited to, the following:

A tool such as a video encoder or decoder scans transform coefficients between a two-dimensional block and a one-dimensional array according to a scan pattern. The block is 4×4, and the scan pattern biases the vertical direction by starting with the DC coefficient and three AC coefficients of the lowest horizontal frequency. Or, the block is 8×4, and the scan pattern biases the vertical direction by starting with the DC coefficient and three AC coefficients of the lowest horizontal frequency. Or, the block is 4×8, and the scan pattern biases the horizontal direction for the lowest frequency AC coefficients in the horizontal and vertical directions but biases the vertical direction for at least some other AC coefficients.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIG. 2 is a diagram showing encoding of a block with intra-picture compression according to the prior art.

FIG. 3 is a diagram showing decoding of a block with intra-picture decompression according to the prior art.

FIG. 4 is a diagram showing encoding of a block with inter-picture compression according to the prior art.

FIG. 5 is a diagram showing decoding of a block with inter-picture decompression according to the prior art.

FIG. 6 is a set of diagrams illustrating different transform sizes.

FIGS. 7A through 7G, 8, 9, 10, and 11A through 11G are charts showing scan patterns for transform coefficients before entropy coding/after entropy decoding according to the prior art.

FIG. 15A is a diagram of part of an interlaced video frame, showing alternating lines of a top field and a bottom field.

FIG. 15B is a diagram of the interlaced video frame organized for encoding/decoding as a frame, and FIG. 15C is a diagram of the interlaced video frame organized for encoding/decoding as fields.

FIGS. 18A and 18B are charts showing scan patterns for transform coefficients in 8×4 and 4×8 inter-coded blocks for progressive video.

FIGS. 20A through 20D are charts showing scan patterns for transform coefficients in inter-coded blocks for interlaced video.

DETAILED DESCRIPTION

The present application relates to techniques and tools for efficient compression and decompression with improved scan patterns. In various described embodiments, a video encoder and decoder incorporate techniques for encoding and decoding with the improved scan patterns.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 12:
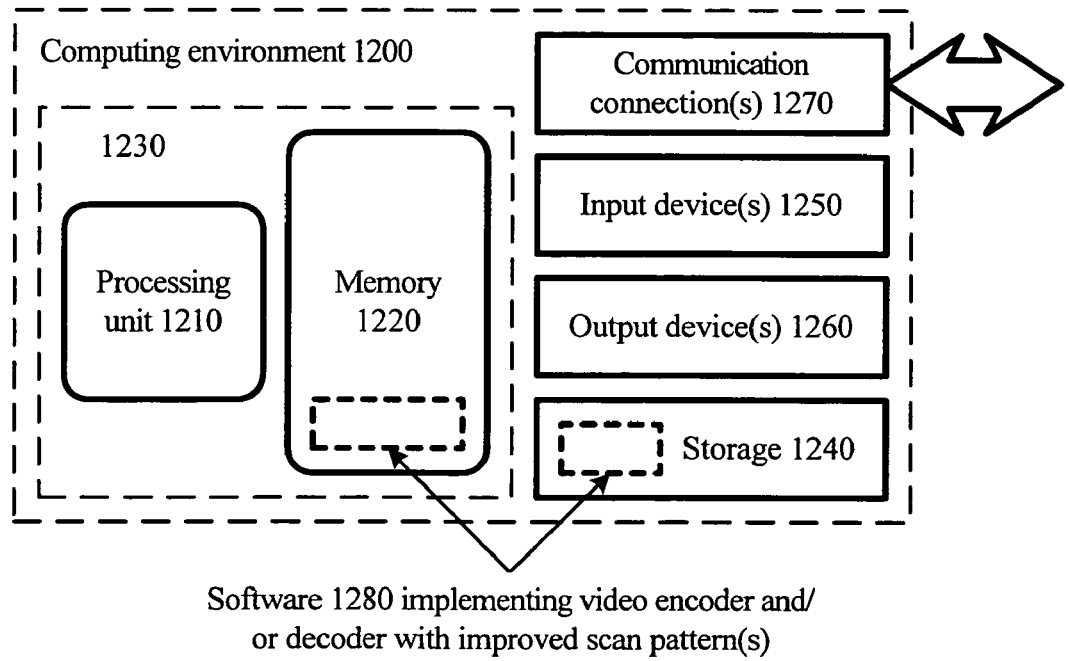
FIG. 12 is a block diagram of a suitable computing environment in which several described embodiments may be implemented.

FIG. 12 illustrates a generalized example of a suitable computing environment (1200) in which several of the described embodiments may be implemented. The computing environment (1200) is not intended to suggest any limitation as to scope of use or functionality, as the techniques and tools may be implemented in diverse general-purpose or special-purpose computing environments.

With reference to FIG. 12, the computing environment (1200) includes at least one processing unit (1210) and memory (1220). In FIG. 12, this most basic configuration (1230) is included within a dashed line. The processing unit (1210) executes computer-executable instructions and may be a real or a virtual processor. In a multi-processing system, multiple processing units execute computer-executable instructions to increase processing power. The memory (1220) may be volatile memory (e.g., registers, cache, RAM), non-volatile memory (e.g., ROM, EEPROM, flash memory, etc.), or some combination of the two. The memory (1220) stores software (1280) implementing a video encoder and/or decoder with improved scan pattern(s).

A computing environment may have additional features. For example, the computing environment (1200) includes storage (1240), one or more input devices (1250), one or more output devices (1260), and one or more communication connections (1270). An interconnection mechanism (not shown) such as a bus, controller, or network interconnects the components of the computing environment (1200). Typically, operating system software (not shown) provides an operating environment for other software executing in the computing environment (1200), and coordinates activities of the components of the computing environment (1200).

The storage (1240) may be removable or non-removable, and includes magnetic disks, magnetic tapes or cassettes, CD-ROMs, DVDs, or any other medium which can be used to store information and which can be accessed within the computing environment (1200). The storage (1240) stores instructions for the software (1280) implementing the video encoder or decoder.

The input device(s) (1250) may be a touch input device such as a keyboard, mouse, pen, or trackball, a voice input device, a scanning device, or another device that provides input to the computing environment (1200). For audio or video encoding, the input device(s) (1250) may be a sound card, video card, TV tuner card, or similar device that accepts audio or video input in analog or digital form, or a CD-ROM or CD-RW that reads audio or video samples into the computing environment (1200). The output device(s) (1260) may be a display, printer, speaker, CD-writer, or another device that provides output from the computing environment (1200).

The communication connection(s) (1270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (1200), computer-readable media include memory (1220), storage (1240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "signal," "determine," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 13:
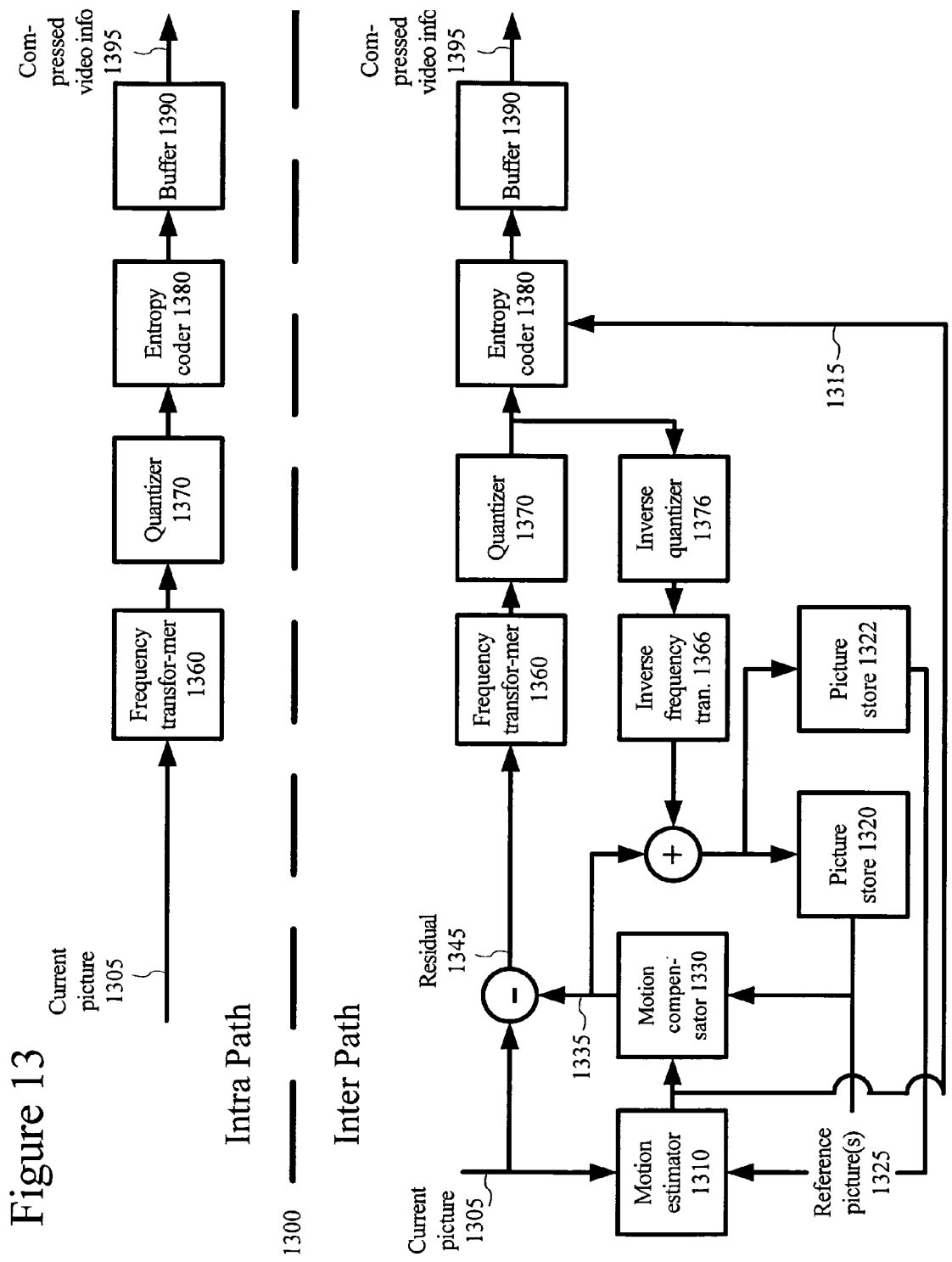
FIGS. 13 and 14 are block diagrams of a video encoder system and a video decoder system, respectively, in conjunction with which several described embodiments may be implemented.
Figure 14:
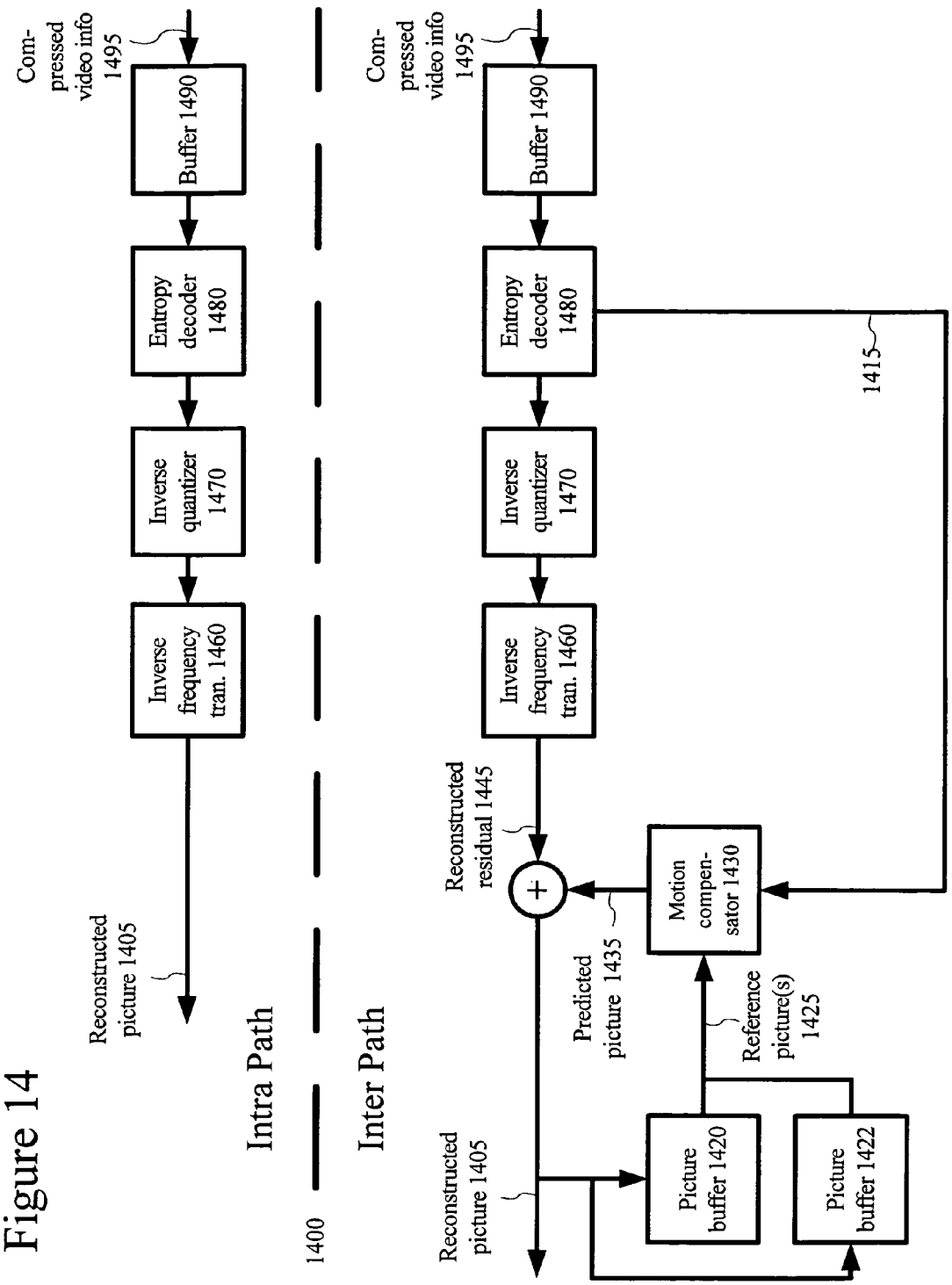

FIG. 13 is a block diagram of a generalized video encoder system (1300), and FIG. 14 is a block diagram of a generalized video decoder system (1400), in conjunction with which various described embodiments may be implemented.

The relationships shown between modules within the encoder and decoder indicate the main flow of information in the encoder and decoder; other relationships are not shown for the sake of simplicity. In particular, FIGS. 13 and 14 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (1300) and decoder (1400) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (1300) and decoder (1400) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (1300) and decoder (1400) process video frames organized as follows. A frame contains lines of spatial information of a video signal. For progressive video, these lines contain samples starting from one time instant and continuing through successive lines to the bottom of the frame. A progressive video frame is divided into macroblocks in conventional 4:2:0 macroblock format. Such a macroblock includes four 8×8 luminance blocks (Y1 through Y4) and two 8×8 chrominance blocks that are co-located with the four luminance blocks but half resolution horizontally and vertically. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Interlaced video is commonly used in digital video broadcasting systems, whether over cable, satellite, or DSL. Efficient techniques and tools for compressing and decompressing interlaced video are important parts of a video codec.

An interlaced video frame consists of two scans of a frame—one comprising the even lines of the frame (the top field) and the other comprising the odd lines of the frame (the bottom field). The two fields may represent two different time periods or they may be from the same time period. FIG. 15A shows part of an interlaced video frame (1500), including the alternating lines of the top field and bottom field at the top left part of the interlaced video frame (1500).

FIG. 15B shows the interlaced video frame (1500) of FIG. 15A organized for encoding/decoding as a frame (1530). The interlaced video frame (1500) has been partitioned into macroblocks such as the macroblocks (1531) and (1532), which use a 4:2:0 format as shown in FIG. 15. In the luminance plane, each macroblock (1531, 1532) includes 8 lines from the top field alternating with 8 lines from the bottom field for 16 lines total, and each line is 16 pixels long. (The actual organization and placement of luminance blocks and chrominance blocks within the macroblocks (1531, 1532) are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P and B-frames may include intra-coded macroblocks as well as different types of predicted macroblocks.

FIG. 15C shows the interlaced video frame (1500) of FIG. 15A organized for encoding/decoding as fields (1560). Each of the two fields of the interlaced video frame (1500) is partitioned into macroblocks. The top field is partitioned into macroblocks such as the macroblock (1561), and the bottom field is partitioned into macroblocks such as the macroblock (1562). (Again, the macroblocks use a 4:2:0 format as shown in FIG. 15, and the organization and placement of luminance blocks and chrominance blocks within the macroblocks are not shown.) In the luminance plane, the macroblock (1561) includes 16 lines from the top field and the macroblock (1562) includes 16 lines from the bottom field, and each line is 16 pixels long. An interlaced I-field is a single, separately represented intra-coded field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (1300) and decoder (1400) are object-based, use a different macroblock or block format, or perform operations on sets of pixels of different size or configuration than 8×8 blocks and 16×16 macroblocks.

B. Video Encoder

FIG. 13 is a block diagram of a generalized video encoder system (1300). The encoder system (1300) receives a sequence of video pictures including a current picture (1305) (e.g., progressive video frame, interlaced video frame, or field of an interlaced video frame), and produces compressed video information (1395) as output. Particular embodiments of video encoders typically use a variation or supplemented version of the generalized encoder (1300).

The encoder system (1300) compresses predicted pictures and key pictures. For the sake of presentation, FIG. 13 shows a path for key pictures through the encoder system (1300) and a path for forward-predicted pictures. Many of the components of the encoder system (1300) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called an I- picture or intra-coded picture) is compressed without reference to other pictures.

If the current picture (1305) is a forward-predicted picture, a motion estimator (1310) estimates motion of macroblocks or other sets of pixels of the current picture (1305) with respect to a reference picture, which is a reconstructed previous picture (1325) buffered in the picture store (1320). In alternative embodiments, the reference picture is a later picture or the current picture is bi-directionally predicted. The motion estimator (1310) can estimate motion by pixel, ½ pixel, ¼ pixel, or other increments, and can switch the precision of the motion estimation on a picture-by-picture basis or other basis. The precision of the motion estimation can be the same or different horizontally and vertically. The motion estimator (1310) outputs as side information motion information (1315) such as motion vectors. A motion compensator (1330) applies the motion information (1315) to the reconstructed previous picture (1325) to form a motion-compensated current picture (1335). The prediction is rarely perfect, however, and the difference between the motion-compensated current picture (1335) and the original current picture (1305) is the prediction residual (1345). Alternatively, a motion estimator and motion compensator apply another type of motion estimation/compensation.

A frequency transformer (1360) converts the spatial domain video information into frequency domain (i.e., spectral) data. For block-based video pictures, the frequency transformer (1360) applies a DCT or variant of DCT to blocks of the pixel data or prediction residual data, producing blocks of DCT coefficients. Alternatively, the frequency transformer (1360) applies another conventional frequency transform such as a Fourier transform or uses wavelet or subband analysis. The frequency transformer (1360) applies an 8×8, 8×4, 4×8, or other size frequency transform (e.g., DCT) to prediction residuals for predicted pictures.

A quantizer (1370) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (1300) can use frame dropping, adaptive filtering, or other techniques for rate control.

If a given macroblock in a predicted picture has no information of certain types (e.g., no motion information for the macroblock and no residual information), the encoder (1300) may encode the macroblock as a skipped macroblock. If so, the encoder signals the skipped macroblock in the output bitstream of compressed video information (1395).

When a reconstructed current picture is needed for subsequent motion estimation/compensation, an inverse quantizer (1376) performs inverse quantization on the quantized spectral data coefficients. An inverse frequency transformer (1366) then performs the inverse of the operations of the frequency transformer (1360), producing a reconstructed prediction residual (for a predicted picture) or reconstructed samples (for an intra-coded picture). If the picture (1305) being encoded is an intra-coded picture, then the reconstructed samples form the reconstructed current picture (not shown). If the picture (1305) being encoded is a predicted picture, the reconstructed prediction residual is added to the motion-compensated predictions (1335) to form the reconstructed current picture. The picture store (1320) buffers the reconstructed current picture for use in predicting a next picture. The encoder may apply a deblocking filter to adaptively smooth discontinuities between blocks.

At some point after the frequency transformer (1360) but before the entropy coder (1380), the encoder (1300) applies appropriate scan patterns to reorder transform coefficients from two-dimensional blocks into one-dimensional arrays. For example, the encoder (1300) uses one or more of the scan patterns described below.

The entropy coder (1380) compresses the output of the quantizer (1370) as well as certain side information (e.g., motion information (1315), quantization step size). Typical entropy coding techniques include arithmetic coding, differential coding, Huffinan coding, run length coding, LZ coding, dictionary coding, and combinations of the above. The entropy coder (1380) typically uses different coding techniques for different kinds of information (e.g., DC coefficients, AC coefficients, different kinds of side information), and can choose from among multiple code tables within a particular coding technique.

The entropy coder (1380) puts compressed video information (1395) in the buffer (1390). A buffer level indicator is fed back to bit rate adaptive modules. The compressed video information (1395) is depleted from the buffer (1390) at a constant or relatively constant bit rate and stored for subsequent streaming at that bit rate. Therefore, the level of the buffer (1390) is primarily a fimction of the entropy of the filtered, quantized video information, which affects the efficiency of the entropy coding. Alternatively, the encoder system (1300) streams compressed video information immediately following compression, and the level of the buffer (1390) also depends on the rate at which information is depleted from the buffer (1390) for transmission.

Before or after the buffer (1390), the compressed video information (1395) can be channel coded for transmission over the network. The channel coding can apply error detection and correction data to the compressed video information (1395).

C. Video Decoder

FIG. 14 is a block diagram of a generalized video decoder system (1400). The decoder system (1400) receives information (1495) for a compressed sequence of video pictures and produces output including a reconstructed picture (1405) (e.g., progressive video frame, interlaced video frame, or field of an interlaced video frame). Particular embodiments of video decoders typically use a variation or supplemented version of the generalized decoder (1400).

The decoder system (1400) decompresses predicted pictures and key pictures. For the sake of presentation, FIG. 14 shows a path for key pictures through the decoder system (1400) and a path for forward-predicted pictures. Many of the components of the decoder system (1400) are used for decompressing both key pictures and predicted pictures. The exact operations performed by those components can vary depending on the type of information being decompressed.

A buffer (1490) receives the information (1495) for the compressed video sequence and makes the received information available to the entropy decoder (1480). The buffer (1490) typically receives the information at a rate that is fairly constant over time, and includes a jitter buffer to smooth short-term variations in bandwidth or transmission. The buffer (1490) can include a playback buffer and other buffers as well. Alternatively, the buffer (1490) receives information at a varying rate. Before or after the buffer (1490), the compressed video information can be channel decoded and processed for error detection and correction.

The entropy decoder (1480) entropy decodes entropy-coded quantized data as well as entropy-coded side information (e.g., motion information (1415), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (1480) frequently uses different decoding techniques for different kinds of information (e.g., DC coefficients, AC coefficients, different kinds of side information), and can choose from among multiple code tables within a particular decoding technique.

If the picture (1405) to be reconstructed is a forward-predicted picture, a motion compensator (1430) applies motion information (1415) to a reference picture (1425) to form a prediction (1435) of the picture (1405) being reconstructed. For example, the motion compensator (1430) uses a macroblock motion vector to find a macroblock in the reference picture (1425). A picture buffer (1420) stores previous reconstructed pictures for use as reference pictures. The motion compensator (1430) can compensate for motion at pixel, ½ pixel, ¼ pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (1400) also reconstructs prediction residuals.

An inverse quantizer (1470) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

At some point after the entropy decoder (1480) but before the inverse frequency transformer (1460), the decoder (1400) applies appropriate scan patterns to reorder transform coefficients from one-dimensional arrays into two-dimensional blocks. For example, the decoder (1400) uses one or more of the scan patterns described below.

An inverse frequency transformer (1460) converts the quantized, frequency domain data into spatial domain video information. For block-based video pictures, the inverse frequency transformer (1460) applies an IDCT or variant of IDCT to blocks of the DCT coefficients, producing pixel data or prediction residual data for key pictures or predicted pictures, respectively. Alternatively, the frequency transformer (1460) applies another conventional inverse frequency transform such as a Fourier transform or uses wavelet or subband synthesis. The inverse frequency transformer (1460) applies an 8×8, 8×4, 4×8, or other size inverse frequency transform (e.g., IDCT) to prediction residuals for predicted pictures.

When the decoder needs a reconstructed picture for subsequent motion compensation, the picture store (1420) buffers the reconstructed picture for use in predicting a next picture. The decoder may apply a deblocking filter to adaptively smooth discontinuities between blocks.

III. Switching Between Progressive and Interlaced Scan Patterns

Some codecs allow both progressive video and interlaced video in the same sequence. For example, a single video sequence includes a mix of progressive frames, frame-coded interlaced frames, and field-coded interlaced frames. In some embodiments, an encoder and decoder switch between one or more scan patterns adapted for progressive video and one or more scan patterns adapted for interlaced video when scanning transform coefficients from two-dimensional blocks to one-dimensional arrays before entropy coding.

Figure 16:
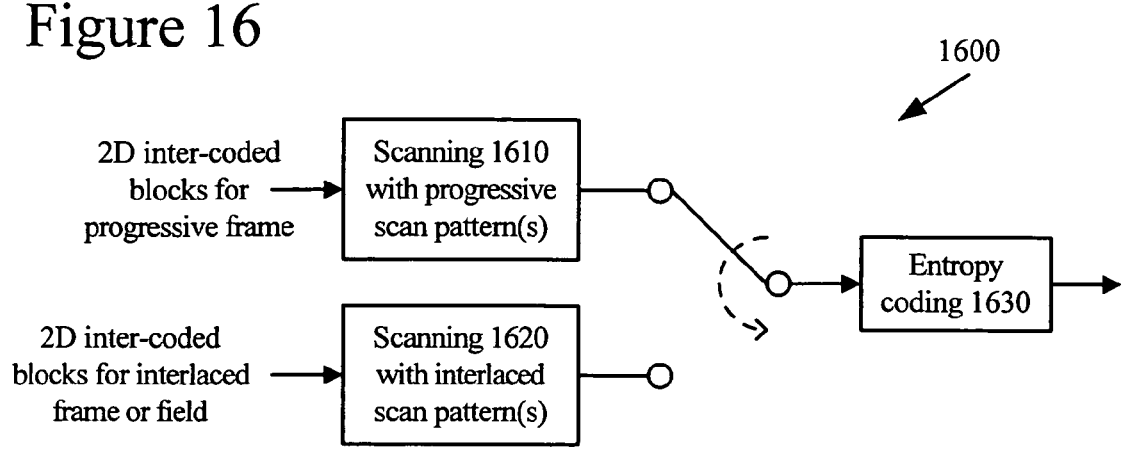
FIG. 16 is a diagram of an encoder system for switching between progressive scan pattern(s) and interlaced scan pattern(s) during encoding of inter-coded blocks.

FIG. 16 shows a system (1600) in an encoder for switching between one or more progressive scan patterns and one or more interlaced scan patterns on a frame-by-frame basis for inter-coded blocks. A corresponding decoder system (not shown) similarly switches between progressive scan pattern(s) and interlaced scan pattern(s) after entropy decoding.

For a given video frame with inter-coded blocks, the system (1600) scans with progressive scan pattern(s) (1610) adapted for progressive video, or it scans with interlaced scan pattern(s) (1620) adapted for interlaced video. For example, the system uses the progressive scan patterns described in Section IV for inter-coded blocks of progressive P- or B-frames, or it uses the interlaced scan patterns described in Section V for inter-coded blocks of interlaced P- or B-frames or fields. Alternatively, the system switches between other and/or additional scan patterns. Or, the system switches scan patterns for intra-coded blocks depending on picture type and/or other coding decisions (e.g., selectively using interlaced scan patterns for some intra-coded blocks of interlaced I-, P- or B-frames, as described in section VII, but using progressive scan patterns for other intra-coded blocks).

After the scanning (1610, 1620), the system (1600) performs entropy coding of the scanned transform coefficients. The system (1600) uses the same entropy coding whether the frame is progressive or interlaced. This reduces the complexity and memory requirements of the encoder. (More importantly, the complexity and memory requirements of the corresponding decoder are similarly reduced.) Section VI describes techniques for designing interlaced and progressive scan patterns to result in similar configurations of non-zero coefficient values in one-dimensional arrays before entropy coding, which enables the use of the same entropy code tables for the different scan patterns. Alternatively, the system uses different entropy coding tables and/or coding techniques for transform coefficients scanned using interlaced scan patterns and progressive scan patterns.

FIG. 16 shows scan pattern switching on a frame-by-frame basis. Alternatively, the system switches between progressive scan patterns and interlaced scan patterns on a scene-by-scene, entry point-by-entry point, or some other basis.

Or, an encoder and decoder process only progressive video and use only the progressive scan patterns described below. Or, an encoder and decoder process only interlaced video and use only the interlaced scan patterns described below.

IV. Progressive Scan Patterns

In some embodiments, an encoder and decoder use a scan pattern adapted for progressive video when scanning transform coefficients between a two-dimensional block of some transform size and a one-dimensional array. For example, the encoder and decoder use 8×8, 8×4, 4×8, and 4×4 scan patterns on variable-size blocks of transform coefficients for motion compensation residuals for progressive video. In particular, the scanning order for 8×4 inter-coded blocks biases the vertical direction to improve compression performance compared to previous 8×4 scanning orders, and the scanning order for 4×8 inter-coded blocks biases the horizontal direction to improve compression performance compared to previous 4×8 scanning orders A. Theory and Examples In general, when variable-size transforms are available, an encoder chooses to encode an inter-coded block having smooth texture with an 8×8 transform or four 4×4 transforms. In this case, there is no strong horizontal or vertical edge in the block. Consequently, the scan pattern for the 8×8 or 4×4 transform block is symmetric or roughly symmetric. For example, the 8×8 inter scan pattern shown in FIG. 7D is a neutral, zigzag scan pattern for lower frequency transform coefficients but has a slight bias in the vertical direction for higher frequency transform coefficients. FIGS. 7D and 7E show scan patterns for progressive video in 8×8 inter-coded blocks and 4×4 inter-coded blocks, respectively.

Figure 17A:
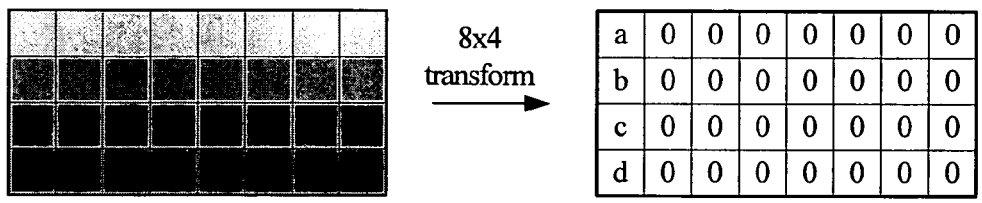
FIGS. 17A and 17B are diagrams showing common configurations of non-zero transform coefficients in 8×4 and 4×8 inter-coded blocks.

Experimental results show, however, that when an encoder selects the 8×4 transform for an inter-coded block, the block tends to have strong horizontal edges (rather than uniform texture or vertical edges). FIG. 17A shows a typical 8×4 inter-coded block with a strong horizontal edge. Each row of the 8×4 residual block has uniform intensity values, with the values gradually changing in intensity row-by-row. After an 8×4 transform (e.g., DCT, integer DCT, or variant thereof), only the first column of the two-dimensional block of transform coefficients contains non-zero coefficient values. Therefore, a scanning order that biases the vertical direction tends to reduce the count of coefficient values scanned into the one-dimensional array before the last non-zero value coefficient is reached. (Although FIG. 17A shows a somewhat idealized pattern of intensity values in an 8×4 residual block, in many common cases there are no non-zero coefficients or very few non-zero coefficients to the right of the first column after a frequency transform and quantization.)

FIG. 18A shows an improved scan pattern for 8×4 inter-coded blocks of progressive video. The scan pattern in FIG. 18A favors the vertical direction over the horizontal direction, scanning columns earlier than rows in the scanning order. The scan pattern biases the vertical direction for at least the lowest frequency AC coefficients in the horizontal and vertical directions, starting with the DC coefficient and the AC coefficient below the DC coefficient.

Figure 17B:
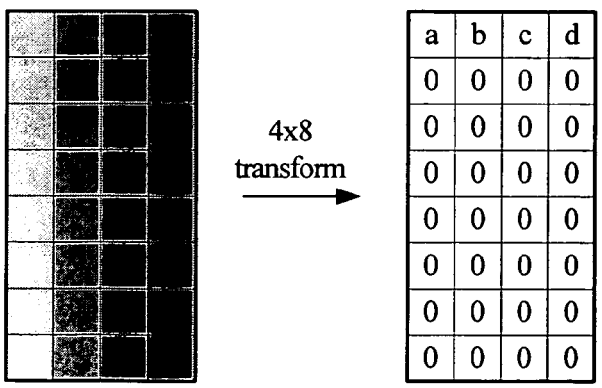

Experimental results also show that when an encoder selects the 4×8 transform for an inter-coded block, the probability of having vertical edges in the block is much higher than the probability of having horizontal edges or the probability of having uniform texture. FIG. 17B shows a typical 4×8 inter-coded block with a strong vertical edge. Each column of the 4×8 residual block has uniform intensity values, with the values gradually changing in intensity column-by-column. After a 4×8 transform (e.g., DCT, integer DCT, or variant thereof), only the first row of the two-dimensional block of transform coefficients contains non-zero coefficient values. This suggests use of a scanning order that biases the horizontal direction, which tends to reduce the count of coefficient values scanned into the one-dimensional array before the last non-zero value coefficient is reached. (Although FIG. 17B shows a somewhat idealized pattern of intensity values in a 4×8 block, in many common cases there are no non-zero coefficients or very few non-zero coefficients below the top row after a frequency transform and quantization.)

FIG. 18B shows an improved scan pattern for 4×8 inter-coded blocks of progressive video. The scan pattern in FIG. 18B assigns higher priorities to the horizontal direction over the vertical direction, scanning rows earlier than columns in the scanning order. The scan pattern biases the horizontal direction for at least the lowest frequency AC coefficients in the horizontal and vertical directions, starting with the DC coefficient and the AC coefficient to the right of the DC coefficient.

Finally, experimental results show that the scanning orders in FIGS. 18A and 18B lead to improved compression performance for 8×4 and 4×8 inter-coded blocks, compared to the scanning patterns in FIGS. 7E and 7F.

B. Scanning Techniques

An encoder such as the encoder (1300) of FIG. 13 or a decoder such as the decoder (1400) of FIG. 14 applies an improved 8×4 or 4×8 scan pattern to an inter-coded block of progressive video. For example, the encoder/decoder performs the technique (1900) shown in FIG. 19.

First the encoder/decoder selects (1910) the improved 8×4 or 4×8 progressive scan pattern, depending on the transform size used for the inter-coded block. The encoder/decoder then applies (1920) the selected scan pattern. For example, the encoder scans transform coefficients from a two-dimensional transform block into a one-dimensional array. Or, the decoder scans transform coefficients from a one-dimensional array into a two-dimensional transform block. The encoder/decoder then processes (1930) the results of the scanning. For example, the encoder performs entropy coding or the decoder performs inverse quantization, an inverse transform, etc.

Figure 19:
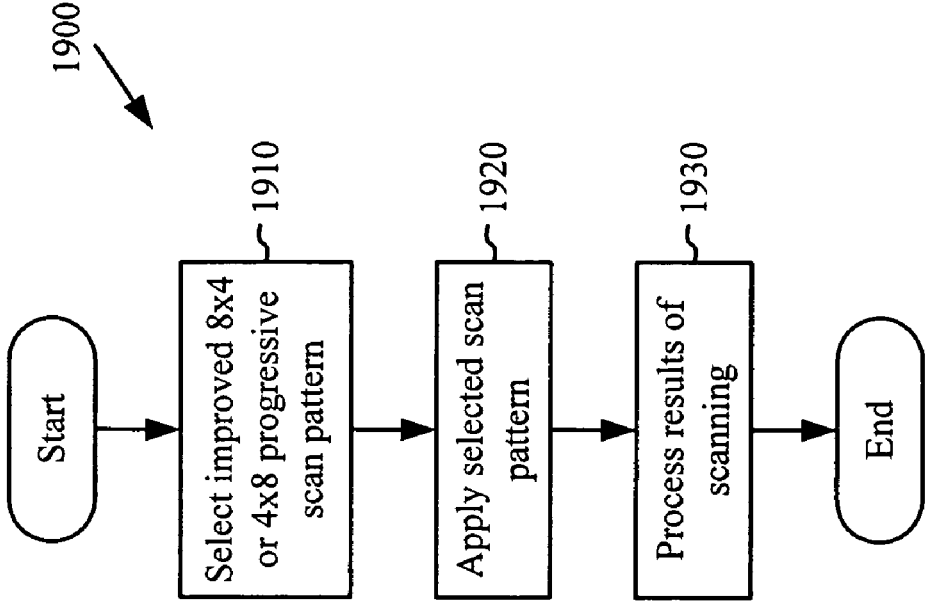
FIG. 19 is a flowchart showing a technique for applying an improved scan pattern for an 8×4 or 4×8 inter-coded block of progressive video.

For the sake of simplicity, FIG. 19 does not show the various ways in which the technique (1900) may be integrated with other aspects of encoding and decoding.

V. Interlaced Scan Patterns

In some embodiments, an encoder and decoder use a scan pattern adapted for interlaced video when scanning transform coefficients between a two-dimensional block of some transform size and a one-dimensional array. For example, the encoder and decoder use 8×8, 8×4, 4×8, and 4×4 scan patterns on variable-size blocks of transform coefficients for motion compensation residuals for interlaced video frames or fields. In particular, new 8×8, 8×4, 4×8, and 4×4 scanning orders use a vertically dominant approach for inter-coded blocks of interlaced video, based on the observed properties of the inter-coded blocks of interlaced video. The 8×8, 8×4, and 4×4 scanning orders aggressively favor the vertical direction. The 4×8 scanning order initially biases the horizontal direction (to account for dominant vertical edges) but then favors the vertical direction (to account for the properties of the interlaced video). Using the new interlaced scan patterns results in as much as a 9% improvement in compression efficiency for interlaced video, compared to the use of the scanning orders shown in FIGS. 7D through 7G for interlaced video.

A. Theory and Examples

As noted above, for progressive video, when variable-size transforms are used, an encoder generally chooses to encode an inter-coded block having smooth texture (no strong horizontal or vertical edges) with an 8×8 transform or four 4×4 transforms, and the 8×8 and 4×4 progressive scan patterns are adapted for such cases.

For interlaced video, however, smooth textures in inter-coded blocks are not as likely. The vertical distance between samples of an interlaced video field is twice the vertical distance between samples of a progressive video frame, due to the interlacing of lines. As a result, the vertical variance of samples in blocks of interlaced fields is generally greater than the horizontal variance in those blocks, and it is also greater than the variance for blocks of progressive frames. This is true even after motion compensation (i.e., it is also true for intensity values in residual blocks). Consequently, even for 8×8 and 4×4 inter-coded blocks, interlaced scan patterns should favor coefficients in the vertical direction, especially those in the first column. FIGS. 20A and 20D show such scan patterns for 8×8 and 4×4 inter-coded blocks of interlaced video, respectively. The 4×4 interlaced scan pattern in FIG. 20D aggressively biases the vertical direction by starting with the DC coefficient and three AC coefficients of the lowest horizontal frequency. The 8×8 scan pattern of FIG. 20A may also be used for intra-coded blocks of interlaced I-, P-, or B-frames when no AC prediction is used.

Experimental results show that when an encoder selects the 8×4 transform for an inter-coded block of an interlaced video frame or field, the block tends to have strong horizontal edges rather than uniform texture or vertical edges. This suggests a vertical bias in scanning order. (See FIG. 17A and the related discussion.) The greater vertical sampling distance for interlaced fields further increases the probability of non-zero coefficients in the vertical direction, especially in the first column. Consequently, a scanning order that aggressively biases the vertical direction tends to reduce the count of coefficients before the last non-zero value coefficient is reached in the scanning.

The interlaced mode 8×4 scan pattern in FIG. 20B strongly favors the vertical direction over the horizontal direction, biasing the vertical direction even more aggressively than the progressive mode 8×4 scanning order shown in FIG. 18A. The scan pattern aggressively biases the vertical direction by starting with the DC coefficient and three AC coefficients of the lowest horizontal frequency.

Experimental results show that when an encoder selects the 4×8 transform for an inter-coded block of an interlaced video frame or field, the probability of having vertical edges in the block is much higher than the probability of having horizontal edges or the probability of having uniform texture. This suggests a horizontal bias in scanning order. (See FIG. 17B and the related discussion.) On the other hand, the greater vertical sampling distance for interlaced fields should also be considered in the interlaced mode 4×8 scan pattern.

FIG. 20C shows an interlaced mode 4×8 scan pattern that first scans the DC and two AC horizontal coefficients (which reflects the fact that vertical edges usually dominate 4×8 inter-coded blocks) but in the remaining scanning gives relatively higher priority to transform coefficients in the first column (to account for greater vertical variance in intensity values). Both observed properties of interlaced 4×8 blocks are thus incorporated into the interlaced mode 4×8 scan pattern. The scan pattern biases the horizontal direction at the lowest frequency AC coefficients in the horizontal and vertical directions but biases the vertical direction for higher frequency AC coefficients.

B. Scanning Techniques

An encoder such as the encoder (1300) of FIG. 13 or a decoder such as the decoder (1400) of FIG. 14 applies an improved interlaced scan pattern to an inter-coded block of an interlaced video frame or field. For example, the encoder/decoder performs the technique (2100) shown in FIG. 21.

First the encoder/decoder selects (2110) an improved interlaced scan pattern, depending on the transform size used for the inter-coded block. The encoder/decoder then applies (2120) the selected scan pattern. For example, the encoder scans transform coefficients from a two-dimensional transform block into a one-dimensional array. Or, the decoder scans transform coefficients from a one-dimensional array into a two-dimensional transform block. The encoder/decoder then processes (2130) the results of the scanning. For example, the encoder performs entropy coding or the decoder performs inverse quantization, an inverse transform, etc.

Figure 21:
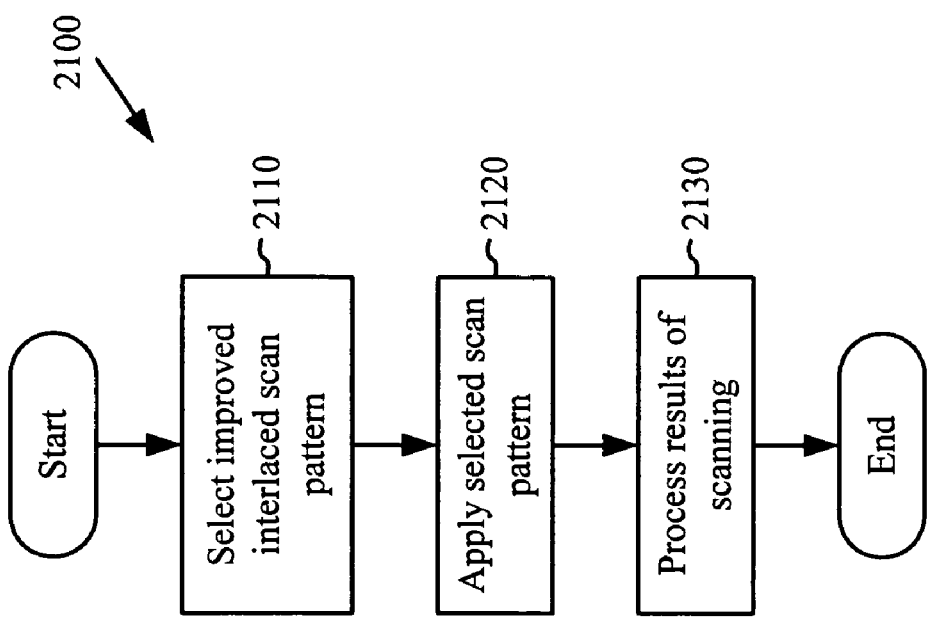
FIG. 21 is a flowchart showing a technique for applying an improved scan pattern for an 8×8, 8×4, 4×8, or 4×4 inter-coded block of interlaced video.

For the sake of simplicity, FIG. 21 does not show the various ways in which the technique (2100) may be integrated with other aspects of encoding and decoding.

VI. Joint Design of Progressive and Interlaced Scan Patterns

Some codecs support both progressive video and interlaced video. In some embodiments, one or more progressive scan patterns and one or more interlaced scan patterns are jointly designed such that they result in similar probability distributions for coefficients after scanning into one-dimensional arrays. This allows a codec to use the same entropy coding techniques and tables regardless of whether a progressive scan pattern or interlaced scan pattern is used.

More specifically, the scan patterns in FIGS. 18A, 18B, and 20A through 20D have been designed in view of the scan patterns in FIGS. 7D and 7G such that, after scanning, the non-zero probabilities of the same index are roughly identical in both progressive and interlaced formats for a given transform size. In other words, $$p_1(x) \approx p_2(x),$$

where $p_1(x)$ is the probability of non-zero coefficient at scan index x in a progressive mode block, $p_2(x)$ is the probability of non-zero coefficient at scan index x in an interlace mode block, and $x=0, \ldots, N-1$. N is 16 for inter-coded 4×4 blocks, 32 for inter-coded 8×4 and 4×8 blocks, 64 for inter-coded 8×8 blocks, and 63 for intra-coded 8×8 blocks interlaced P-, B-frames (the DC coefficients of intra-coded blocks are coded separately). This property enables the same entropy coding and entropy code tables to be applied to whether interlaced scan patterns or progressive scan patterns are used, as illustrated in FIG. 16.

For example, from a training set of video sequences, optimal scan patterns for progressive and interlaced formats are found for a particular set of entropy coding rules and code tables. The orderings for both the progressive and interlaced scan patterns are then optionally adjusted so that $p_1(x) \approx p_2(x)$, that is, so the probability of having a non-zero coefficient at index x is roughly the same in corresponding progressive and interlaced scan orders. The initial scan patterns for both progressive and interlaced content are thus adjusted towards compromise orderings. Alternatively, one or more progressive scan patterns and one or more interlaced scan patterns are jointly designed according to another strategy.

VII. Combined Implementation

A detailed combined implementation for using different scan patterns during decoding is now described. After decoding transform coefficients, the coefficients are in a one-dimensional array. The decoder uses a scan pattern to reorder the transform coefficients into a two-dimensional array of transform coefficients for the block. The two-dimensional array of transform coefficients is processed with an inverse transform.

The decoder performs such scanning whether the block is intra-coded (i.e., has transform coefficients for actual sample values) or inter-coded (i.e., has transform coefficients for motion-compensated prediction residual values). The decoder performs scanning whether the transform size is 8×8, 8×4, 4×8, or 4×4. And, the decoder performs scanning whether the current picture is a progressive I-, P-, or B-frame, interlaced I-, P-, or B-frame, or interlaced I-, P-, or B-field. The precise scan pattern used for the scanning may vary depending on (1) whether the block is intra-coded or inter-coded, (2) the transform size, and (3) the current picture type.

Different profiles use different encoding tools for different tradeoffs of performance and complexity. Progressive video is encoded in the simple, main or advanced profile. The advanced profile (but not the simple or main profile) supports interlaced video in that it includes adaptations for interlaced video.

A. Scan Patterns for Blocks of Progressive I-frames

A progressive I-frame includes intra-coded blocks. For an 8×8 block, decoding of entropy coded run-level pairs produces a one-dimensional array of 63 quantized AC coefficients. The elements in the one-dimensional array are scanned out into positions 1-63 of an 8×8 two-dimensional array in preparation for the inverse transform. The DC coefficient is in position 0. A scan pattern is used to scan out the remaining 63 AC coefficients in the one-dimensional array to the 8×8 array. One of three scan patterns is used depending on the AC prediction status for the block. FIG. 7A shows the "normal" scan array chosen when AC prediction is not used. FIG. 7B shows the "horizontal" scan array chosen when AC prediction is used and prediction is from the top. FIG. 7C shows the "vertical" scan array chosen when AC prediction is used and prediction is from the left.

B. Scan Pattern for Inter-coded Blocks of Progressive P-, B-frames

A progressive P-frame may include intra-coded blocks and/or inter-coded blocks. For an inter-coded block of a progressive P-frame, a one-dimensional array of quantized coefficients produced in the run-level decoding process is scanned out into a two-dimensional array, which may have a size of 8×8, 8×4, 4×8, or 4×4. Each transform size has an associated scan array. One array is used per transform size for the inter-coded blocks.

FIG. 7D shows the scan array used for an 8×8 transform size for an inter-coded block of progressive mode video in the simple, main, and advanced profiles. FIGS. 7E and 7F show the scan arrays used for 8×4 and 4×8 transform sizes in the simple and main profiles. On the other hand, FIGS. 18A and 18B show the scan arrays used for 8×4 and 4×8 transform sizes in the advanced profile. FIG. 7G shows the scan array used for a 4×4 transform size in the simple, main, and advanced profiles.

For progressive B-frames, the scan patterns for inter-coded blocks are the same as those used for progressive P-frames.

C. Scan Pattern for Intra-coded Blocks of Progressive P-, B-frames

For an 8×8 intra-coded block of a progressive P-frame, the scan order used to scan run-length decoded transform coefficients into an 8×8 array is the same as that used for an 8×8 inter-coded block of a progressive P-frame (see FIG. 7D). This differs from intra-coded blocks in progressive I-frames, which use one of three scan patterns depending on AC prediction status.

For progressive B-frames, the scan patterns for intra-coded blocks are the same as those used for progressive P-frames.

D. Scan Patterns for Blocks of Interlaced I-fields

The scan patterns used for blocks of interlaced I-fields are the same as those used for the blocks of progressive I-frames (see FIGS. 7A-7C).

E. Scan Patterns for Blocks of Interlaced P-, B-fields

An interlaced P-field may include intra-coded blocks and/or inter-coded blocks. For an inter-coded block of an interlaced P-field, a one-dimensional array of quantized coefficients produced in the run-level decoding process is scanned out into a two-dimensional array, which may have a size of 8×8, 8×4, 4×8, or 4×4. Each transform size has an associated scan array. FIGS. 20A-20D show the scan array used for 8×8, 8×4, 4×8, and 4×4 transform sizes, respectively, for an inter-coded block of interlaced mode video in the advanced profile. For an 8×8 intra-coded block of an interlaced P-field, the scan order used to scan transform coefficients into an 8×8 array is the same as that used for an 8×8 inter-coded block of an interlaced P-field (see FIG. 20A).

For interlaced B-fields, the scan patterns are the same as those used for interlaced P-fields.

F. Scan Patterns for Blocks of Interlaced I-frames

An interlaced I-frame includes intra-coded blocks. The process of AC (possibly differential) coefficient decoding is basically the same as for advanced profile progressive I-frames. When there is no AC prediction, however, the intra mode 8×8 scan pattern shown in FIG. 20A is used (instead of the normal intra scan pattern shown in FIG. 7A). When there is AC prediction, the scan patterns are identical between interlaced I-frame and advanced profile progressive I-frame.

G. Scan Patterns for Blocks of Interlaced P-, B-frames

An interlaced P-frame may include intra-coded blocks and/or inter-coded blocks. For an intra-coded block, the block is decoded like a block of an interlaced I-frame. For an inter-coded block, the block is decoded like an inter-coded block of an interlaced P-field, so one of the scan patterns shown in FIGS. 20A through 20D is used. For interlaced B-frames, the scan patterns are the same as those used for interlaced P-frames.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

In view of the many possible embodiments to which the principles of our invention may be applied, we claim as our invention all such embodiments as may come within the scope and spirit of the following claims and equivalents thereto.

We claim:

1. A method for transforming encoded video information using a computing device that implements a video decoder, the method comprising:

with the computing device that implements the video decoder:

entropy decoding transform coefficients in a one-dimensional array;

scanning the transform coefficients from the one-dimensional array into a two-dimensional block according to a scan pattern, wherein the block is 4 coefficients in a horizontal direction by 8 coefficients in a vertical direction, wherein the scan pattern is for interlaced video, wherein the scan pattern biases the horizontal direction for the lowest frequency AC coefficients in the horizontal and vertical directions but biases the vertical direction for at least some other AC coefficients, and wherein scan pattern is:

| 0 | 1 | 2 | 9 |
|---|---|---|---|
| 3 | 5 | 8 | 22 |
| 4 | 7 | 15 | 24 |
| 6 | 14 | 17 | 26 |
| 10 | 16 | 19 | 28 |
| 11 | 18 | 23 | 29 |
| 12 | 20 | 25 | 30 |
| 13 | 21 | 27 | 31; | and processing results of the scanning, wherein the processing includes performing an inverse frequency transform on the two-dimensional block of transform coefficients.

2. The method of claim 1 further comprising:

with the computing device that implements the video decoder:

entropy decoding a second set of transform coefficients in a second one-dimensional array;

scanning the second set of transform coefficients from the second one-dimensional array into a second two-dimensional block according to a second scan pattern, wherein the second block is 4 coefficients in the horizontal direction by 4 coefficients in the vertical direction, wherein the second scan pattern is for interlaced video, wherein the second scan pattern biases the vertical direction by starting with the DC coefficient and three AC coefficients of the lowest horizontal frequency in the second set of transform coefficients, and wherein the second scan pattern is:

| 0 | 4 | 7 | 11 |
|---|---|---|---|
| 1 | 5 | 9 | 13 |
| 2 | 6 | 10 | 14 |
| 3 | 8 | 12 | 15; | and processing results of the scanning the second set of transform coefficients, wherein the processing the results of the scanning the second set of transform coefficients includes performing an inverse frequency transform on the second two-dimensional block of transform coefficients.

3. The method of claim 2 wherein the second scan pattern is adapted for higher vertical than horizontal variance in intensity values.

4. The method of claim 1 further comprising:

with the computing device that implements the video decoder:

entropy decoding a second set of transform coefficients in a second one-dimensional array;

scanning the second set of transform coefficients from the second one-dimensional array into a second two-dimensional block according to a second scan pattern, wherein the second block is 8 coefficients in the horizontal direction by 4 coefficients in the vertical direction, wherein the second scan pattern is for interlaced video, wherein the second scan pattern biases the vertical direction by starting with the DC coefficient and three AC coefficients of the lowest horizontal frequency in the second set of transform coefficients, and wherein the second scan pattern is:

| 0 | 4 | 6  | 10 | 13 | 17 | 21 | 27  |
|---|---|----|----|----|----|----|-----|
| 1 | 5 | 9  | 14 | 16 | 18 | 24 | 29  |
| 2 | 7 | 11 | 15 | 19 | 22 | 25 | 30  |
| 3 | 8 | 12 | 20 | 23 | 26 | 28 | 31; | and processing results of the scanning the second set of transform coefficients, wherein the processing the results of the scanning the second set of transform coefficients includes performing an inverse frequency transform on the second two-dimensional block of transform coefficients.

5. The method of claim 4 wherein the second scan pattern is adapted for strong horizontal edges and for higher vertical than horizontal variance in intensity values.

6. The method of claim 1 wherein the scan pattern is adapted for strong vertical edges and for higher vertical than horizontal variance in intensity values.

* * * * *